United States Patent
Kato et al.

(10) Patent No.: US 6,645,619 B2
(45) Date of Patent: Nov. 11, 2003

(54) MODIFIED POLYTRIMETHYLENE TEREPHTHALATE

(75) Inventors: Jinichiro Kato, Nobeoka (JP); Tetsuko Takahashi, Nobeoka (JP); Shinichi Okajima, Nobeoka (JP); Katsuhiro Fujimoto, Nobeoka (JP); Kenji Imura, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/149,393

(22) PCT Filed: Dec. 15, 2000

(86) PCT No.: PCT/JP00/08935

§ 371 (c)(1),
(2), (4) Date: Jun. 12, 2002

(87) PCT Pub. No.: WO01/44345

PCT Pub. Date: Jun. 21, 2001

(65) Prior Publication Data

US 2003/0065105 A1 Apr. 3, 2003

(30) Foreign Application Priority Data

Dec. 15, 1999 (JP) .............................. 11/355273
Apr. 14, 2000 (JP) ....................... 2000-112880
Aug. 3, 2000 (JP) ....................... 2000-235309

(51) Int. Cl.⁷ ............................ D02G 3/00; C08F 20/00
(52) U.S. Cl. ....................... 428/359; 528/275; 528/295; 528/301; 528/302; 528/308; 528/308.6; 428/362; 428/364; 264/176.1; 264/177.17; 264/177.19; 264/178 R; 264/210.8; 264/211.2; 525/437

(58) Field of Search ................................ 528/275, 295, 528/301, 302, 308, 308.6; 428/359, 362, 364; 264/176.1, 177.17, 177.19, 178 R, 210.8, 211.12; 525/437

(56) References Cited

U.S. PATENT DOCUMENTS

| | | | |
|---|---|---|---|
| 5,348,832 A | 9/1994 | Sacripante et al. | 430/109 |
| 6,284,370 B1 * | 9/2001 | Fujimoto et al. | 428/364 |
| 6,316,101 B2 * | 11/2001 | Kato et al. | 428/364 |
| 6,331,606 B1 * | 12/2001 | Sun | 528/295 |
| 6,423,407 B1 * | 7/2002 | Abe et al. | 428/364 |
| 6,423,814 B1 | 7/2002 | Kato et al. | 528/272 |

FOREIGN PATENT DOCUMENTS

| | | |
|---|---|---|
| EP | 1 006 220 A1 | 6/2000 |
| FR | 2 720 400 | 12/1995 |
| JP | 5-70567 | 3/1993 |
| JP | 8-311177 | 11/1996 |
| JP | WO99/09238 | 2/1999 |
| JP | 2000-159876 | 6/2000 |
| WO | WO 99/11709 | 3/1999 |

* cited by examiner

Primary Examiner—Samuel A. Acquah
(74) Attorney, Agent, or Firm—Finnegan, Henderson, Farabow, Garrett & Dunner, L.L.P.

(57) ABSTRACT

The present invention provides poly(trimethylene terephthalate) copolymerized with ester-forming sulfonate and a fiber thereof. The polymer of the present invention is high in melting point, small in loss of melting viscosity and has a high molecular weight. The fiber of the present invention is high in toughness, excellent in whiteness and dyeable with a cationic dye, whereby it is useful for clothing, carpets or non-woven sheets, etc.

20 Claims, 5 Drawing Sheets

MODIFIED POLYTRIMETHYLENE TEREPHTHALATE

TECHNICAL FIELD

The present invention relates to poly(trimethylene terephthalate) copolymer (hereinafter poly(trimethylene terephthalate) is referred to as PTT), a method for producing the same, a fiber using the same and a fibrous product thereof. More specifically, it relates to PTT copolymer high in molecular weight to be a material for a PTT fiber dyeable with cationic dye, a method for producing the same, a fiber using the same and a fibrous product thereof.

Even more specifically, the invention relates to PTT copolymer capable of being produced at a high solid-state polymerization rate and having a small loss in melting viscosity, which is excellent in hue and high in molecular weight as a material for PTT fiber dyeable with cationic dye, a PTT fiber dyeable with a cationic dye excellent in processability and high in toughness, which does not shrink much during dyeing or heat-setting, and a fibrous product thereof.

BACKGROUND ART

PTT fiber obtained by melt-spinning polycondensate of terephthalic acid or lower alcohol ester of terephthalic acid and 1,3-propanediol (also referred to as trimethylene glycol) is excellent in touch of soft feeling, drapability and stretchability and is superior in low-temperature dyeability and weather resistance. These qualities have never been seen in an existing synthetic fiber such as poly(ethylene terephthalate) fiber (poly(ethylene terephthalate) is hereinafter referred to as PET) or nylon 6 fiber.

The applicant of this patent application has overcome various problems relating to the development of PTT and PTT fiber and the processing thereof, and has recently marketed a PTT fiber (trade name: Solo Fiber) for the first time in the world.

The PTT fiber could be more widely used by combining it with other fiber material or being post-treated. According to the prior art PTT fiber, however, problems relating the dyeing may occur if the mating fiber to be combined therewith or the processing technique is unsuitable. For example, as the PTT fiber is dyeable substantially solely with a disperse dye, the disperse dye is liable to migrate to the polyurethane elastomeric yarn or resin having a coarse structure to deteriorate a color fastness such as wash-fastness, sweat-fastness or dry cleaning-fastness when the PTT fiber is combined with a polyurethane elastomeric yarn or the fabric of the PTT fiber is treated with polyurethane resin.

To solve the above problems, if the PTT fiber is modified to be dyeable with cationic dye, the cationic dye is ionic-bonded with a sulfonate which is a dyeing seat introduced into PTT, whereby the above-mentioned migration of dye does not occur to result in a high color fastness. Also, there is a characteristic that the clarity of the dyed fabric becomes higher.

The present inventors have already proposed a PTT fiber dyeable with cationic dye (hereinafter referred to as a CD-PTT fiber) for the purpose of further facilitating the excellent features of the PTT fiber while solving the above-mentioned problems regarding the dyeing (WO99/09238). According to this technology, CD-PTT and a CD-PTT fiber formed thereof are provided by esterification-reacting terephthalic acid which is a dicarbonic acid component and/or lower alcohol ester of terephthalic acid, typically dimethyl terephthalate, with 1,3-propanediol which is a diol component, and adding an ester-forming metallic salt of sulfonic acid which is a dyeing seat for cationic dye. Although this technology provides the PTT dyeable with cationic dye, which has been difficult in the prior art, it is still insufficient in view of the industrial production. Also, although the CD-PTT obtained by the above-mentioned technology is excellent in whiteness, this is still unsatisfactory in a use in which whiteness or strength at a higher level is required.

On the other hand, regarding a PTT homopolymer (hereinafter referred to as a homo PTT) other than CD-PTT, Japanese Unexamined Patent Publication No. 8-311177 (Kokai) discloses a method for obtaining a PTT having a b value of 10 or less and a content of oligomer of 1 wt % or less by esterification-reacting 1,3-propanediol with a terephthalic acid component, polycondensating an esterification-reaction product thus obtained to result in a prepolymer having an intrinsic viscosity in a range from 0.7 to 0.8, and polycondensating, in a solid state, the prepolymer thus obtained at a temperature in a range from 190 to 210° C. to result in an intrinsic viscosity of 0.9 or more. Also, Japanese Unexamined Patent Publication (Kokai) No. 2000-159876, disclose a polymerization technology providing a homo PTT excellent in solid-state polymerization speed and melting stability by combining a titanium catalyst with a magnesium catalyst.

However, there are neither a description nor a suggestion, in these publications, regarding the CD-PTT or the significance of the copolymerization of ester-forming metallic salt of sulfonic acid. Particularly, since the melting stability becomes worse in comparison with homo PTT, as described later, when an ester-forming metallic salt of sulfonic acid is used as a copolymerization component, the same effect would not be expected even if the technology used for the homo PTT is applied as it is to the CD-PTT. In the above publication, however, there is neither a description nor a suggestion of the solution thereto. The homo PTT described in either of these publications is unsatisfactory in whiteness. Particularly, according to Japanese Unexamined Patent Publication (Kokai) No. 2000-159876, since a magnesium catalyst is combinatorily used for the polymerization, the L value (brightness) of the polymer becomes less than 70 to result in a blackish polymer, and this technology is not applicable to a CD-PTT requiring a clear color.

Known CD-PTT fibers have problems to be solved similar to CD-PTT. That is, the known CD-PTT fibers are problematic in that 1) since they are formed of a polymer of a low molecular weight, a toughness (the toughness is a fiber stiffness usually represented by the product of a fiber strength and a square root of a fiber elongation) causes a fabric to be easily broken, and 2) as they are excessively drawn in spite of their low molecular weight, the orientation of molecules in an amorphous region is liable to relax by heat during the dyeing or heat-setting process to cause a large fiber shrinkage, which results in a harsh feeling of hand touch of a fabric, and it is difficult that the fabric develops adequately a soft feeling.

DISCLOSURE OF THE INVENTION

The present inventors have found the following problems by diligently studying the polymerization or spinning technology of CD-PTT.

In the melt-spinning process of CD-PTT, as metallic salts of sulfonic acid copolymerized with each other are ionically crosslinked in a melting state, the melting viscosity significantly rises. Thereby, the removal of 1,3-propanediol is inhibited at a polycondensating reaction stage to result in a problem that it is difficult to increase the degree of polymerization. In addition, as CD-PTT has a lower thermal stability in comparison with PET, poly(buthylene terephthalate) or homo PTT, which have similar structures thereto, the molecular weight thereof does not rise even if the polycondensation time is prolonged but the depolymerization occurs due to the heat decomposition before the molecular weight reaches a level necessary for forming fibers, which yellows the polymer itself, and a high-molecular weight CD-PTT is not obtainable.

The present inventors have studied a high-molecular weight CD-PTT and succeeded in obtaining a CD-PTT having a high molecular weight, not achievable through the melt-spinning method, by once preparing a low-molecular weight CD-PTT (hereinafter referred to as a prepolymer) and polymerizing the same in a solid state. As a result of specifically studying the melt-spinning characteristic, hue and solid-state polymerization characteristic, however, the following problems have been found when this technology is carried out on an industrial scale.

That is, if characteristics such as an amount of terminal carboxyl groups of the prepolymer obtained through the melt-polymerization are outside a certain range, the solid-state polymerization speed, the melting stability or hue of the high-molecular weight CD-PTT thus obtained largely deteriorates. Particularly, the amount of terminal carboxyl groups is deeply related to copolymerization ratios, catalysts, additives and conditions of polycondensating reaction. Accordingly, the present inventors have newly found that these factors must be precisely controlled to obtain the high-molecular weight CD-PTT which is the object of the present invention.

On the other hand, although the tensile strength can be increased to a relatively high level by applying a high draw ratio to melt-spun fibers formed of the low-molecular weight CD-PTT, the fiber shrinkage becomes higher because the molecules are excessively stretched for the purpose of facilitating the tensile strength. When a fabric formed of such high-shrinkage fibers is subjected to a subsequent processing such as a dyeing, the fiber largely shrinks to make the fabric harsh to the hand, which is opposite to the soft feeling of hand touch expected from a low elastic modulus of PTT.

Such a phenomenon does not occur in a PET fiber having a structure similar to PTT. This is because, as PTT has a spiral molecular structure, even if the molecule of the PTT fiber is forcibly stretched, an amorphous region thereof largely shrinks when heated so that the molecular structure returns to the original stable spiral structure, resulting in the large shrinkage of the fiber. On the contrary, a molecular structure of PET is liable to have an irreversible stretched structure. While a soft feeling of hand touch could be obtained by suitably controlling the shrinkage, the weaving or knitting density must be extremely low in such a case when the fabric is prepared, which is very difficult in design.

A first problem of the present invention is to provide a high-molecular weight PTT copolymer suitable for material of a PTT fiber dyeable with cationic dye and excellent in hue, which is produced by the solid-state polymerization at a high speed and at a small decline of melting viscosity, and a method for producing the same.

A second problem of the present invention is to provide a PTT dyeable with cationic dye high, in toughness and excellent in processability, which does not largely shrink during the dyeing or heat-setting process, and a method for producing the same.

The present inventors have specifically studied the melt-polymerization characteristic and the solid-state polymerization characteristic of CD-PTT and found that the above-mentioned problems can be solved by controlling an amount of terminal carboxyl groups at a final stage of the melt-polymerization while using an ester-forming metallic salt of sulfonic acid which prepares dyeing seats for cationic dye. Further, the present inventors have found the necessary conditions for achieving the dyeability and color fastness for cationic dye, based on which the inventive CD-PTT is obtained.

The present inventors have found that the inventive PTT fiber high in toughness, low in shrinkage during the dyeing or heat-setting process as well as being excellent in processability is obtainable by extruding CD-PTT, having a high polymerization degree in a certain range, uniformly from a spinneret having a surface temperature and an atmospheric temperature in a certain range to result in an undrawn yarn low in orientation and crystallization and good in drawability which is then drawn at a ratio in a certain range.

That is, the present invention is as follows:

1. A PTT copolymer characterized in that it satisfies the following conditions (1) to (4):
   (1) ester-forming sulfonate in a range from 0.5 to 5 mol % is copolymerized relative to a total dicarbonic acid component.
   (2) bis (3-hydroxypropyl) ether in a range from 0.1 to 2.5 wt % is copolymerized;
   (3) an intrinsic viscosity is in a range from 0.65 to 1.5 dl/g, and
   (4) an amount of terminal carboxyl groups is 25 milli-equivalent per kg resin or less.

2. A PTT copolymer as defined by the above item 1 wherein the intrinsic viscosity is in a range from 0.85 to 1.25 dl/g.

3. A PTT copolymer as defined by the above item 1 wherein a b* value is in a range from −2 to 6.

4. A method for producing a PTT copolymer characterized in that the method comprises the steps of: reacting lower alcohol ester of terephthalic acid, which is a main dicarboxylic acid component, with 1,3-propanediol, which is a main diol component, to form 1,3-propanediol ester of terephthalic acid and/or oligomer thereof; after completing the polycondensation reaction, once solidifying the resultant polymer; and heating the polymer in a solid state to increase an intrinsic viscosity thereof by 0.1 dl/g or more from that at a time when the polycondensation reaction has completed, and the method satisfies the following conditions (a) and (b):
   (a) ester-forming sulfonate corresponding to an amount in a range from 0.5 to 5 mol % of a total dicarbonic acid component is added at any optional stage from the initiation of reaction to the completion of the polycondensation reaction, and
   (b) an amount of terminal carboxyl groups of PTT copolymer is in a range from 5 to 40 milli-equivalent per kg resin before the initiation of solid-state polymerization.

5. A method for producing a PTT copolymer characterized in that the method comprises the steps of: reacting terephthalic acid, which is a main dicarboxylic acid component, with 1,3-propanediol, which is a main diol component, to form 1,3-propanediol ester of terephthalic acid and/or oligomer thereof; after completing the polycondensation reaction, solidifying the resultant polymer; and heating the polymer in a solid state to increase an intrinsic viscosity thereof by 0.1 dl/g or more from that at a time when the polycondensation reaction has completed, and the method satisfies the following conditions (a) to (c):

(a) the molar ratio of 1,3-propanediol to terephthalic acid is in a range from 0.8 to 2.5, (b) in the reaction of terephthalic acid with diol mainly composed of 1,3-propanediol, at a stage wherein a rate of reaction of terephthalic acid is in a range from 75 to 100%, an amount of ester-forming sulfonate corresponding to a range from 0.5 to 5 mol % of total dicarboxylic acid component is added, and (c) the amount of terminal carboxyl groups of PTT copolymer is in a range from 5 to 40 milli-equivalent per kg resin before the initiation of solid-state polymerization.

6. A method for producing a PTT copolymer comprising the steps of: by reacting terephthalic acid, which is a main dicarboxylic acid component, with 1,3-propanediol, which is a main diol component, to form 1,3-propanediol ester of terephthalic acid and/or oligomer thereof; after completing the polycondensation reaction, characterized in that the method satisfies the following conditions (a) to (c):

(a) a molar ratio of 1,3-propanediol to terephthalic acid is in a range from 0.8 to 2.5, (b) in the reaction of terephthalic acid with diol mainly composed of 1,3-propanediol, at a stage wherein a rate of reaction of terephthalic acid is in a range from 75 to 100%, an amount of ester-forming sulfonate corresponding to a range from 0.5 to 5 mol % of total dicarboxylic acid component is added, and (c) an amount of terminal carboxyl groups of PTT copolymer is in a range from 5 to 40 milli-equivalent per kg resin.

7. A method for producing a PTT copolymer as defined by any one of the above items 4 to 6, wherein an alkaline metal compound and/or an alkaline earth metal compound corresponding to an amount in a range from 1 to 100 mol % of ester-forming sulfonate is added at any optional stage from the initiation of reaction to the completion of the polycondensation reaction.

8. A PTT copolymer fiber characterized in that it satisfies the following conditions (1) to (4):

(1) ester-forming sulfonate in a range from 0.5 to 5 mol % is copolymerized relative to a total dicarboxylic acid component.

(2) bis (3-hydroxypropyl) ether in a range from 0.1 to 2.5 wt % is copolymerized;

(3) an intrinsic viscosity is in a range from 0.65 to 1.5 dl/g, and (4) an amount of terminal carboxyl groups is in a range from 5 to 40 milli-equivalent per kg fiber or less.

9. A PTT copolymer fiber characterized in that ester-forming sulfonate in a range from 0.5 to 5 mol % is copolymerized relative to a total dicarboxylic acid component, and the fiber satisfies the following conditions (A) to (C):

(A) an intrinsic viscosity [η] is in a range from 0.65 to 1.4 dl/g, (B) a peak temperature of a dynamic loss tangent is in a range from 105 to 140° C., and (C) a boiling water shrinkage is in a range from 0 to 16%.

10. A PTT copolymer fiber as defined by the above item 9, further satisfying the following conditions (D) and (E):

(D) an elongation at break is in a range from 20 to 70%, and (E) a toughness is 16 or more, wherein the toughness is calculated by the following equation:

$$\text{Toughness} = [\text{Strength } (cN/dtex)] \times [\text{Elongation } (\%)]^{1/2}$$

11. A PTT copolymer fiber as defined by the above item 10, wherein the toughness is 17.5 or more.

12. An undrawn PTT copolymer fiber characterized in that it consists of PTT formed by copolymerizing ester-forming sulfonate in a range from 0.5 to 5 mol % to a total dicarboxylic acid component to have an intrinsic viscosity in a range from 0.65 to 1.4 dl/g, and it has an elongation at break in a range from 150 to 600% and a crystallization peak temperature in a range from 64 to 80° C.

13. A method for producing a PTT copolymer fiber characterized in that an undrawn PTT copolymer fiber, having an elongation at break in a range from 150 to 600% and a crystallization peak temperature in a range from 64 to 80° C., is drawn at a draw ratio in a range from 30 to 99% of the maximum draw ratio, and the undrawn PTT copolymer fiber consists of PTT formed by copolymerizing ester-forming sulfonate in a range from 0.5 to 5 mol % to a total dicarboxylic acid component to have an intrinsic viscosity in a range from 0.65 to 1.5 dl/g.

14. A method for producing a PTT copolymer fiber characterized in that the PTT is formed by copolymerizing ester-forming sulfonate in a range from 0.5 to 5 mol % to a total dicarboxylic acid component to have an intrinsic viscosity in a range from 0.65 to 1.5 dl/g, the PTT is extruded from a spinneret having a surface temperature in a range from 250 to 295° C. and, after being cooled and solidified, is taken up at a speed in a range from 100 to 3,000 m/min to be an undrawn yarn which is then drawn at a temperature in a range from 30 to 90° C. and a draw ratio which is in a range from 30 to 99% of the maximum draw ratio and, then a drawn fiber obtained is heat-treated at a temperature from 100 to 200° C.

15. A method for producing a PTT copolymer fiber as defined by the above item 14, wherein the PTT is extruded from a spinneret with a heating tube having a length in a range from 20 to 500 mm and heated at a temperature in a range from 150 to 350° C.

16. A method for producing a PTT copolymer fiber as defined by any one of the above items 13 to 15, wherein the undrawn fiber is once wound as a package and then drawn.

17. A method for producing a PTT copolymer fiber as defined by any one of the above items 13 to 15, wherein the undrawn fiber is not wound as a package but is continuously drawn.

18. A staple fiber obtained from the PTT copolymer fiber as defined by any one of the above items 8 to 10, wherein the fiber length is in a range from 3 to 300 mm and a degree of crimp is 5% or more.

19. A fiber product in which the PTT copolymer fiber as defined by any one of the above items 8 to 10 is partially or wholly used.

20. A fiber product in which the staple fiber as defined by the above item 18 is partially or wholly used.

Figure 3:
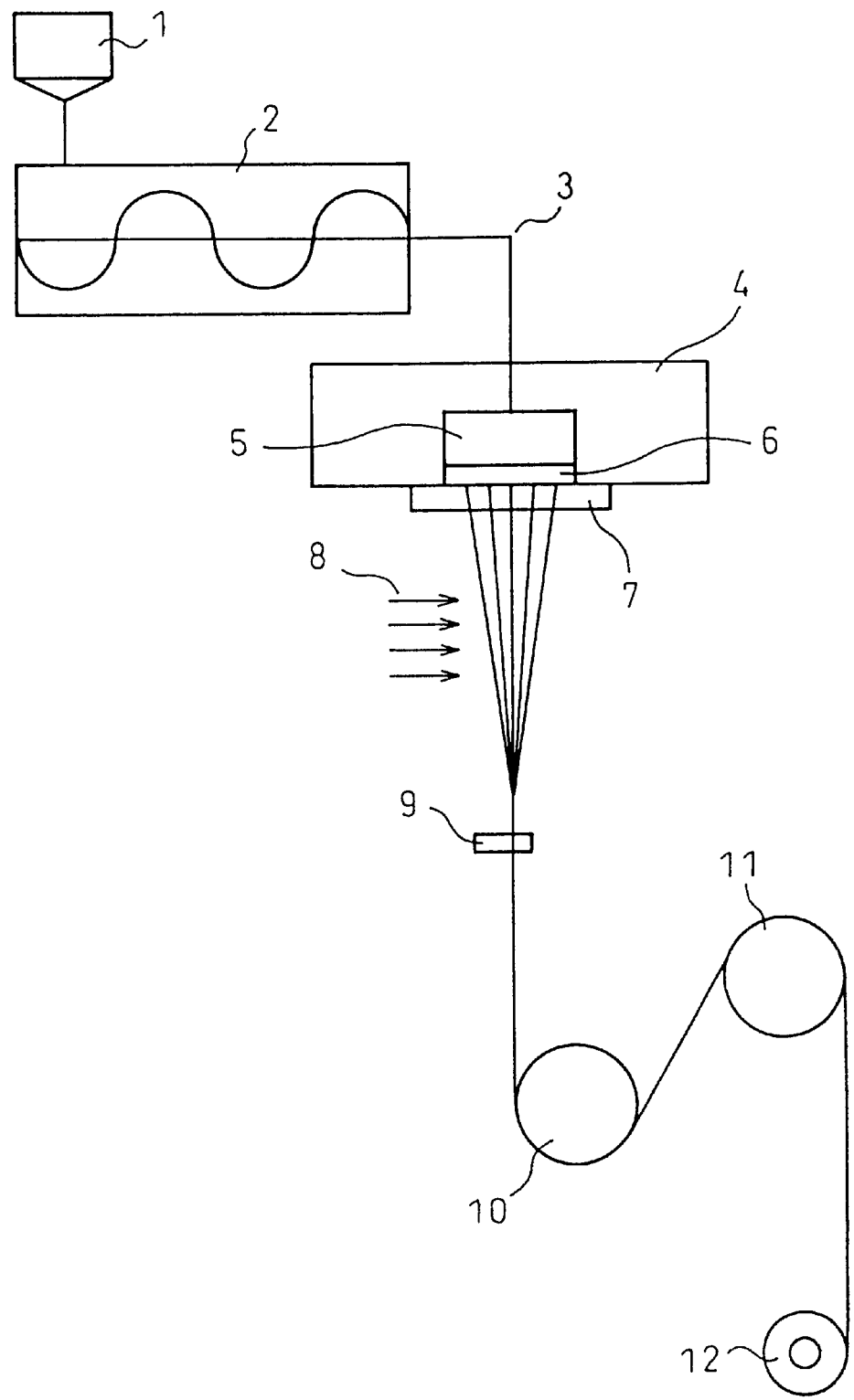
FIG. 3 is a schematic illustration of one embodiment of a method for producing the inventive CD-PTT fiber (a conventional method)
Figure 4:
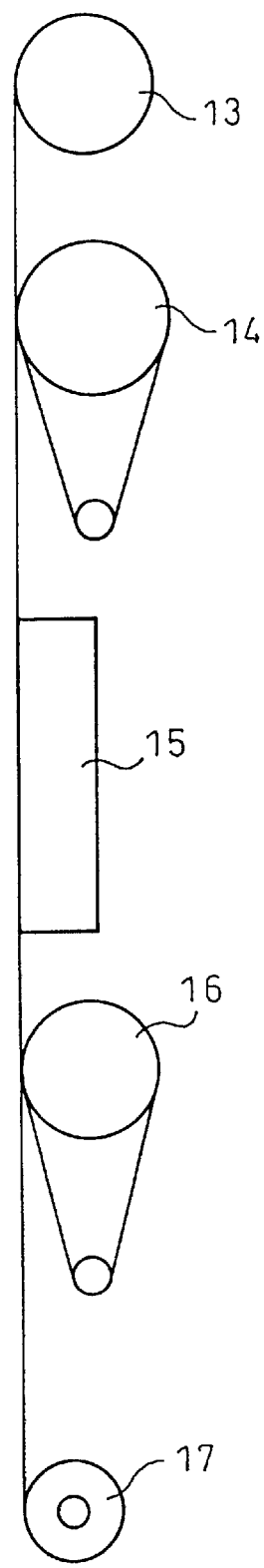
FIG. 4 is a schematic illustration of one embodiment of a process for drawing an undrawn yarn once wound in a method for producing the inventive CD-PTT fiber (a conventional method)
Figure 5:
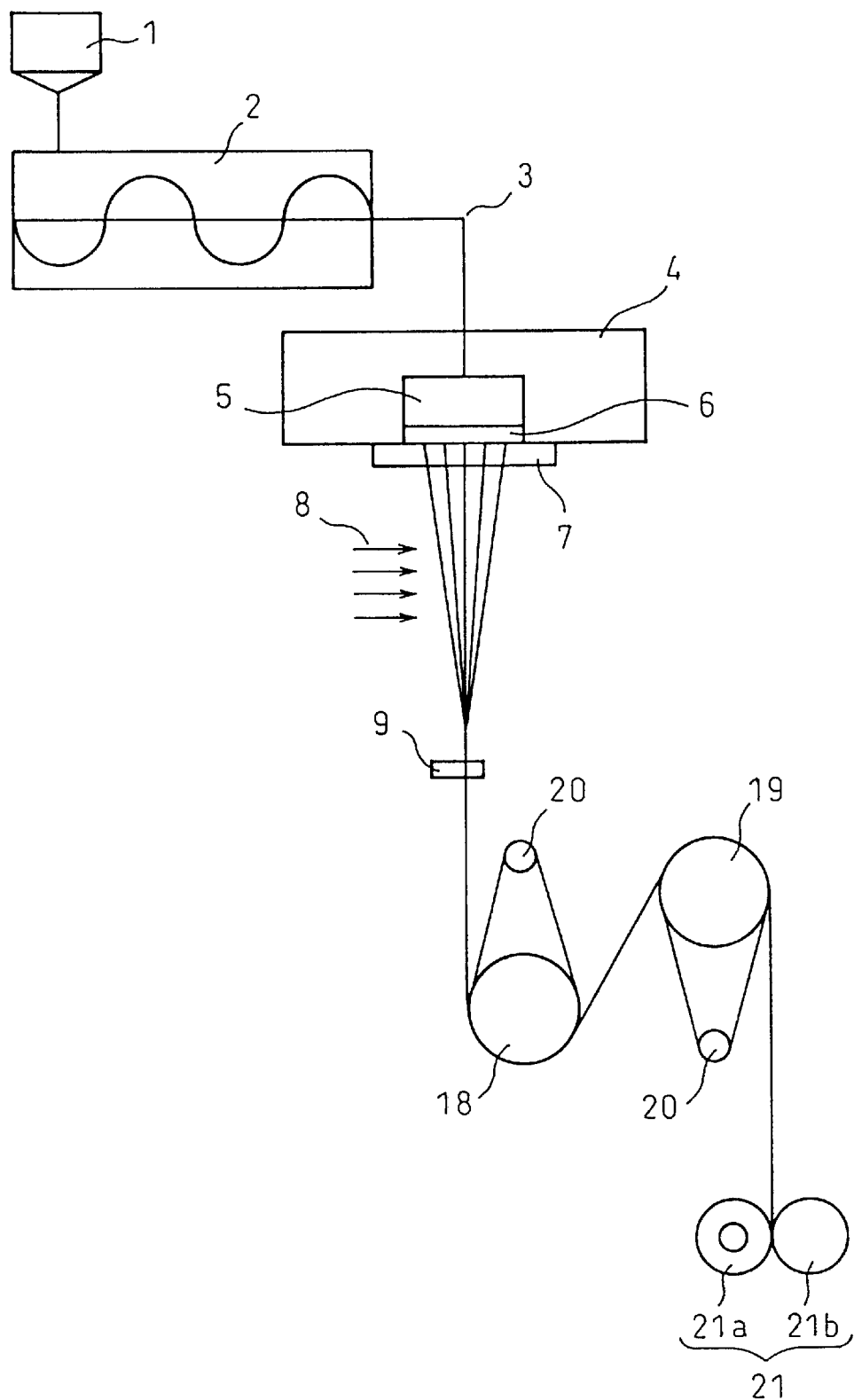
FIG. 5 is a schematic illustration of another embodiment of a method for producing the inventive CD-PTT fiber (a SDTU method).

In this regard, in FIGS. 3 to 5, the reference numerals denote the following:

1: a drier, 2: an extruder, 3: a bend, 4: a spin head, 5: a spin pack, 6: a spinneret, 7: a heating tube, 8: a cooling air, 9: a finishing agent applicator, 10: a first takeup roll, 11: a second takeup roll, 12: a winder (a package), 13: an undrawn yarn, 14: a first draw roll, 15: a hot plate, 16: a second draw roll, 17: a winder, 18: a first roll, 19: a second roll, 20: a free roll, 21: a winder, 21a: a spindle, and 21b: a touch roll.

DETAILED DESCRIPTION OF THE INVENTION

PTT copolymer according to the present invention is a polyester formed by copolymerizing PTT with ester-forming sulfonate in a range from 0.5 to 5 mol %. In this regard, the PTT is a polyester containing terephthalic acid as an acidic component and 1,3-propanediol as a diol component. The ester-forming sulfonate provides a dyeing seat for cationic dye, and is an indispensable copolymer component for achieving the object of the present invention. A surprising effect is obtained in that the hue becomes superior to a homo PTT by copolymerizing the ester-forming sulfonate with PTT although the reason therefor has not been identified.

While examples of the ester-forming sulfonate used in the present invention are compounds containing sulfonate groups represented by the following general formula, there is no limitation provided it is capable of being copolymerized with PTT and has a sulfonate part. For example, in place of metallic salt, organic salt may be used, such as tetraalkylphosphonium salt or tetraalkylammonium salt. However, for the purpose of obtaining PTT having a favorable hue, metallic salts represented by the following formula are preferably used.

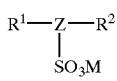

wherein $R^1$, $R^2$ are represented by —COOH, —COOR, —OCOR, 12 —(CH$_2$)$_n$OH, —(CH$_2$)$_n$[O(CH$_2$)$_m$]$_p$OH or —CO[O(CH$_2$)$_n$]$_m$OH; $R^1$, $R^2$ may be either equal or not; R is an alkyl group containing 1 to 10 carbon atoms; n, m and p are an integer of 1 or more; M represents metal, preferably alkaline metal or alkaline earth metal; and Z is a trivalent organic group containing 1 to 30 carbon atoms, preferably a trivalent aromatic group.

Favorable ester-forming sulfonate compounds are, for example, 5-sodium sulfoisophthalate, 5-potassium sulfoisophthalate, 5-lithium sulfoisophthalate, 2-sodium sulfoterephthalate, 2-potassium sulfoterephthalate, 4-sodium sulfo-2,6-naphthalene dicarboxylate, 2-sodium sulfo-4-hydroxybenzoate, or ester derivatives thereof, such as methyl ester or dimethyl ester. Especially, these ester derivatives such as methyl ester or dimethyl ester are preferably used because the resultant polymer is excellent in whiteness and polymerization speed.

A copolymerization ratio of the ester-forming sulfonate is necessarily in a range from 0.5 to 5 mol % relative to a total number of moles of a dicarboxylic acid component forming the polyester. If the copolymerization ratio of the ester-forming sulfonate is less than 0.5 mol %, the color development is lower when dyed with cationic dye. Contrarily, if the copolymerization ratio of the ester-forming sulfonate exceeds 5 mol %, the heat durability of the polymer becomes worse not only to extremely deteriorate the polymerizability and spinnability but also to make yellow the fibers. For the purpose of improving the polymerizability and the spinnability while sufficiently maintaining the dyeability to cationic dye, the copolymerization ratio is preferably in a range from 1 to 3 mol %, more preferably from 1.2 to 2.5 mol %.

Also, bis(3-hydroxypropyl) ether (hereinafter referred to as BPE) is necessarily copolymerized with the inventive CD-PTT in a range from 0.1 to 2.5 wt % relative to a polymer mass. BPE is a chemical substance represented by the following structural formula:

BPE is a substance formed when 1,3-propanediol, which is a raw material for CD-PTT, is dehydrated and dimerized.

When the homo PTT is polymerized by using a lower alcohol ester of terephthalic acid such as dimethyl terephthalate as a raw material, BPE of less than 0.1 wt % is usually formed, as a by-product, and copolymerized with the polymer. Also, if the polymerization is carried out by using terephthalic acid as a raw material, a proton functions as a catalyst for dimerizing 1,3-propanediol, whereby BPE of 0.3 wt % or more is copolymerized with the polymer. On the other hand, during the production of CD-PTT, the ester-forming sulfonate also functions as a catalyst for forming BPE, whereby the copolymerization ratio of BPE becomes higher than that of homo PTT if any terephthalic acid derivative is used as a raw material. While there may be an adverse effect on the melting stability, polymerization reaction and light-resistance of the polymer if an amount of BPE excessively increases, the existence of a proper amount increases the dye exhaustion ratio during the dyeing process or facilitates the alkaline weight reduction. Accordingly, the precise control of BPE amount is important in designing the polymer.

If BPE is less than 0.1 wt %, the melting point becomes high to facilitate the melting stability, but there is a problem in that the dye exhaustion for cationic dye somewhat lowers. Contrarily, if it exceeds 2.5 wt %, the melting point becomes low to deteriorate the thermal stability or the light-resistance. A favorable polymerization ratio of BPE is different in accordance with the carboxylic acid derivatives used as a raw material. When a lower alcohol ester of terephthalic acid is used, a range is preferably from 0.1 to 0.4 wt %, and when terephthalic acid is used, a range is preferably from 0.4 to 2.5 wt %. On account of a favorable balance between the thermal stability, the light-resistance and the dye exhaustion ratio of fibers, the range is preferably from 0.11 to 2.2 wt %, more preferably from 0.15 to 1.8 wt %.

Components other than the ester-forming sulfonate may be copolymerized with the inventive CD-PTT in a range not disturbing the objects of the present invention. Such copolymerized components are, for example, 1,2-butanediol, 1,3-butanediol, 1,4-butanediol, neopentyl glycol, 1,5-pentamethylene glycol, 1,6-hexamethylene glycol, heptamethylene glycol, octamethylene glycol, decamethylene glycol, dodecamethylene glycol, 1,4-cyclohexanediol, 1,3-cyclohexanediol, 1,2-cyclohexanediol, 1,4-cyclohexanedimethanol, 1,3-cyclohexanedimethanol, 1,2-cyclohexanedimethanol, oxalic acid, malonic acid, succinic acid, glutaric acid, adipic acid, diheptanoic acid, dioctanoic acid, sebacic acid, didodecanic acid, 2-methylglutaric acid, 2-methyladipic acid, fumaric acid, maleic acid, itaconic acid, 1,4-cyclohexanedicarboxylic acid, 1,3-cyclohexanedicarboxylic acid, 1,2-cyclohexanedicarboxylic acid, isophthalic acid, poly(ethylene glycol) having a molecular weight in a range from 400 to 100000 or poly (tetraethylene glycol) having a molecular weight in a range from 400 to 100000. The copolymerization ratio is usually 10 wt % or less relative to the polymer mass although it varies in accordance with the copolymerized components.

If necessary, various additives may be copolymerized or mixed with the inventive CD-PTT, for example, a delusterant such as titanium oxide, a heat stabilizer, an antifoamer, a color controller, a fire retardant, an antioxidant, an ultraviolet absorber, an infrared absorber, a cyrstallizing nucleus, a fluorescent whitener or others. Particularly, when titanium oxide is used as a delusterant, the amount thereof is preferably in a range from 0.01 to 0.1 wt % relative to a weight of the polymer.

It is necessary that the inventive CD-PTT has an intrinsic viscosity in a range from 0.65 to 1.5 dl/g. If the intrinsic viscosity is less than 0.65 dl/g, the resultant fiber has a low strength. Contrarily, if the intrinsic viscosity exceeds 1.5 dl/g, the melting viscosity is too high to smoothly carry out weight measurement in a gear pump, whereby the spinnability becomes worse because of the erroneous extrusion of the polymer. The intrinsic viscosity is preferably in a range from 0.7 to 1.5 dl/g, more preferably from 0.85 to 1.25 dl/g for obtaining CD-PTT excellent both in strength and spinnability.

The inventive CD-PTT necessarily has an amount of terminal carboxyl groups of 25 milli-equivalent per kg resin or less, wherein the milli-equivalent per kg resin represents an amount of terminal carboxyl groups per 1 kg CD-PTT. Also, the milli-equivalent per kg fiber represents an amount of terminal carboxyl groups per 1 kg CD-PTT fiber. If the amount of terminal carboxyl group exceeds 25 milli-equivalent per kg resin, the melting stability becomes insufficient or a decline in strength is liable to occur during the treatment in a hot aqueous solution such as the dyeing process. The amount of terminal carboxyl groups is preferably in a range from 2 to 25 milli-equivalent per kg resin, more preferably from 2 to 20 milli-equivalent per kg resin, most preferably from 2 to 15 milli-equivalent per kg resin.

The inventive CD-PTT is preferably has an L value of preferably 70 or more, more preferably 80 or more because clear color development is achievable when dyed with cationic dye. Also, a b* value is preferably in a range from −5 to 8, more preferably from −2 to 6, most preferably from −1 to 5 because clear color development is achievable.

A melting point of the inventive CD-PTT is preferably 223° C. or higher, more preferably 225° C. or higher in view of the melting stability.

A favorable method for producing the inventive CD-PTT will be described below.

Since methods for producing the inventive CD-PTT are somewhat different in the polymerization process between when a lower alcohol of terephthalic acid is used and when terephthalic acid is used, the explanation will be carried out separately as follows:

First, a case wherein no terephthalic acid is substantially used but a lower alcohol ester of terephthalic acid is used will be explained.

The inventive CD-PTT can be produced by a method comprising the steps of: reacting a lower alcohol ester of terephthalic acid, which is a main dicarboxylic acid component, with 1,3-propanediol, which is a main diol component, to form 1,3-propanediol ester of terephthalic acid and/or oligomer thereof; after completing the polycondensation reaction, solidifying the resultant polymer; and heating the polymer in a solid state to increase an intrinsic viscosity thereof by 0.1 dl/g or more from that at a time when the polycondensation reaction has completed, and the method satisfies the following conditions (a) and (b):

(a) ester-forming sulfonate corresponding to an amount in a range from 0.5 to 5 mol % of a total dicarboxylic acid component is added at any optional stage from the initiation of reaction to the completion of the polycondensation reaction, and (b) an amount of terminal carboxyl groups of PTT copolymer is in a range from 5 to 40 milli-equivalent per kg resin before the initiation of solid-state polymerization.

The method for producing the inventive CD-PTT includes an ester interchanging process for condensating a lower alcohol ester of terephthalic acid and 1,3-propanediol to form 1,3-propanediol ester of terephthalic acid and/or oligomer thereof, a polycondensation process for heating the resultant condensate to obtain prepolymer while removing 1,3-propanediol, and a process for polymerizing the prepolymer in a solid state.

First, the ester interchanging process will be described.

A charging ratio of 1,3-propanediol relative to a lower alcohol ester of terephthalic acid which is a raw material is preferably in a range from 0.8 to 3 as represented by a molar ratio. If the charging ratio is less than 0.8, the ester interchanging reaction does not smoothly proceed, while if it exceeds 3, the melting point becomes lower and the resultant polymer is liable to have a poor whiteness. The charging ratio is preferably in a range from 1.4 to 2.5, more preferably from 1.5 to 2.3.

To facilitate the reaction, a catalyst is preferably used, such as titanium alcoxide represented by titanium tetrabuthoxide or titanium tetraisopropoxide; metal oxide such as amorphous titanium oxide precipitate, amorphous titanium oxide/silica co-precipitate or amorphous zirconia precipitate; or metallic carbonate such as calcium acetate, manganese acetate, cobalt acetate or antimony acetate, the use of which in a range from 0.01 to 0.2 wt % relative to a total carbonate component monomer enhances a reaction speed, a whiteness and a thermal stability of the resultant polymer. Of these catalysts, titanium compounds, calcium acetate and cobalt acetate are preferable since the generation of non-melting matters formed by the reaction thereof with ester-forming sulfonate is less. It is possible to carry out the reaction while removing an alcohol such as methanol which is a by-product of the reaction, at a reaction temperature in a range approximately from 200 to 250° C. A reaction time is usually in a range from 2 to 10 hours, preferably from 2 to 4 hours. The resultant reaction product contains 1,3-propanediol ester of terephthalic acid and/or oligomer thereof.

After the ester interchange reaction, the polycondensation reaction is carried out. In a polycondensation reaction carried out in a known method, titanium alcoxide represented by titanium tetrabutoxide and titanium tetraisopropoxide or a metallic oxide such as amorphous titanium oxide precipitate, amorphous titanium oxide/silica co-precipitate or amorphous zirconia precipitate in a range from 0.01 to 0.2 wt % may be added relative to a total carbonate component monomer.

To obtain the inventive CD-PTT high in solid-state polymerization speed and excellent in melting stability and hue, it is necessary that an amount of terminal carboxyl groups of prepolymer is in a range from 5 to 40 milli-equivalent per kg resin upon the completion of the polycondensation reaction. If it exceeds 40 milli-equivalent per kg resin, the solid-state polymerization speed becomes significantly slow, the melting stability is worse to lower the molecular weight and the resultant CD-PTT has a poor hue. Contrarily, if the amount of terminal carboxyl groups is less than 5 milli-equivalent per kg resin, the ester-linkable terminal carboxyl groups reduces to lower the solid-state polymerization speed. The amount of terminal carboxyl groups is preferably in a range from 5 to 35 milli-equivalent per kg resin, more preferably in a range from 10 to 32 milli-equivalent per kg resin.

For achieving such an amount of the terminal carboxyl groups of prepolymer, for example, the polycondensation reaction is carried at a polycondensation temperature in a range from 240 to 270° C. for the most suitable time, usually 4 hours or less, and preferably in a range from 1 to 3 hours while estimating an amount of terminal carboxyl groups of the prepolymer. The polycondensation temperature is preferably in a range from 250 to 270° C., and a degree of vacuum is in a range from 0.13 to 133 Pa. To effectively remove 1,3-propanediol in the polycondensation, it is important to increase the surface area of the polymeric product. To do so, the effective agitation is carried out by using, for example, a helical type agitator, and a charging ratio of a raw material relative to a capacity of an oven is 70% or less, preferably 60% or less. Further, the polycondensation reaction is preferably made to stop while the viscosity of the melting product increases with time at a polycondensation reaction stage. That is, it is important that the polycondensation reaction is made to stop before the melting viscosity descends. The reason is that the melting viscosity does not rise any more but rather descends even if the polymerization time is prolonged, because the thermal decomposition reaction is predominant over the polymerization reaction, whereby an amount of terminal carboxyl groups formed by the thermal decomposition reaction increases.

The ester-forming sulfonate may be added at any stage from the initiation of the ester interchange reaction to the completion of the polycondensation reaction and, in this case, is substantially copolymerized with CD-PTT. An amount to be added is in a range from 0.5 to 5 mol % relative to a total dicarboxylic acid component for the same reason described before.

The ester-forming sulfonate may be added either as a solid or by dissolving it in a suitable solvent; it is particularly preferably added while being dissolved in 1,3-propanediol in view of the ease of the addition and the accuracy of measurement. When dissolved in a solvent such as 1,3-propanediol, an amount of the solvent is preferably reduced as much as possible in view of preventing the melting point of resultant polymer from lowering. Also, the solution may be heated to facilitate the dissolution. The ester-forming sulfonate may be reacted with 1,3-propanediol at a dissolving stage. For this purpose, a known ester interchanging catalyst may be added to the ester-forming sulfonate in a range from 0.01 to 200 wt %, such as carbonate of lithium, calcium, cobalt, manganese, titanium, antimony, zinc or tin; titanium alcoxide or amorphous metallic oxide salt.

For instance, when dimethyl 5-sodium sulfoisophthalate is used as the ester-forming sulfonate, it may be changed in 1,3-propanediol to 5-sodium sulfoisophthalate mono(1,3-propanediol), 5-sodium sulfoisophthalate bis(1,3-propanediol) or 5-sodium sulfoisophthalate monomethyl mono(1,3-propanediol), or may be hydrolyzed by a small amount of water contained in 1,3-propanediol into 5-sodium sulfoisophthalate or monomethyl ester thereof.

In the method for producing the inventive CD-PTT, to reduce the amount of terminal carboxyl groups and facilitate the thermal stability, melting stability and whiteness of the polymer, a heat stabilizer or a color inhibitor is preferably added at any stage of the polymerization, together with the application of the above-mentioned favorable amount of catalyst and reaction temperature.

As the heat stabilizer, penta-valent or trivalent phosphorus compounds or hindered phenolic antioxidants are preferable. For example, the penta- or trivalent phosphorus compounds include trimethylphosphate, triethylphosphate, tributylphosphate, triphenylphosphate, trimethylphosphite, triethylphosphite, triphenylphosphite, phosphoric acid or phosphorus acid; while the hindered phenolic antioxidants include pentaerythritol-tetrakis [3-(3,5-di-tert-butyl-4-hydroxyphenyl)propionate], 1,1,3-tris(2-methyl-4-hydroxy-5-tert-butylphenyl) butane, 1,3,5-trimethyl-2,4,6-tris(3,5-di-tert-butyl-4-hydroxybenzyl) benzene, 3,9-bis(2-[3-(3-tert-butyl-4-hydroxy-5-methylphenyl)propionyloxy]-1,1-dimethylethyl)-2,4,8,10-tetraoxaspiro[5,5]undecan, 1,3,5-tris(4-tert-butyl-3-hydroxy-2,6-dimethylbenzene) isophthalic acid, triethyglycol-bis[3-(3-tert-butyl-5-methyl-4-hydroxyphenyl)propionate], 1,6-hexanediol-bis[3-(3,5-di-tert-butyl-4-hydroxyphenyl)propionate], 2,2-thio-diethylene-bis[3-(3,5-di-tert-butyl-4-hydroxyphenyl) propionate], or octadecyl-3-(3,5-di-tert-butyl-4-hydroxyphenyl) propionate.

An amount to be added is preferably in a range from 0.01 to 0.5 wt % relative to CD-PTT, more preferably from 0.02 to 0.1 wt %. In this regard, even in this range, if an amount of the heat stabilizer is excessive in relation to an amount of catalyst, there may be a case wherein a speed of the polycondensation reaction or solid-state polymerization reaction is lowered, therefore, a ratio of both the amounts is preferably decided based on a suitable experiment. Such a decision of the amount ratio could be easily carried out by a person with ordinary skill in the art.

The color inhibitor includes, for example, cobalt compounds such as cobalt acetate or cobalt formate and a marketed fluorescent brightening agent, and is added to CD-PTT in a range from 0.0001 to 0.1 wt %. These additives may be added at any stage in the polymerization process.

Further, to reduce an infusible aggregate formed by the catalyst, the heat stabilizing agent and an extremely small amount of the ester-forming sulfonate metallic salt, it is preferable to add of alkaline- and/or alkaline earth-metallic salt at any stage of the polymerization, such as lithium acetate, lithium carbonate, lithium formate, sodium acetate, sodium carbonate, sodium formate, sodium hydroxide, calcium hydroxide or magnesium hydroxide. An amount to be added is preferably in a range from 1 to 100 mol %, more preferably from 1 to 20 mol % relative to the ester-forming sulfonate. The alkaline-metallic salts, particularly lithium salt and hydroxide are particularly preferably used.

If an amount of infusible aggregate is too much, there may be a problem in that a pressure in a spinning pack rises to cause yarn breakage. To avoid such a problem, it is necessary to increase the frequency of the replacement of the spinning pack, which deteriorates the productivity. These problems are avoidable by using the above-mentioned additives. While the alkaline-metallic salt may be added at any stage of the polymerization, it is preferably added at a time when the ester interchange reaction has completed, for achieving the effect, and particularly simultaneously with the addition of the ester-forming sulfonate metallic salt.

It is necessary to increase an intrinsic viscosity of the prepolymer obtained as described above through the solid-state polymerization. Particularly, it is difficult to increase the intrinsic viscosity to 0.65 or more without the solid-state polymerization. This is because, if a reaction temperature for the polycondensation is made to rise for the purpose of increasing the intrinsic viscosity, there may be a case in which the heat decomposition occurs to disturb the increase in viscosity. By the solid-state polymerization, it is possible to readily increase the intrinsic viscosity to 0.65 or more without deteriorating the melting stability and hue. The solid-state polymerization can be carried out by using chip, powder, fiber, sheet or block of the prepolymer with the existence of inert gas such as nitrogen or argon, or at a subatmospheric pressure of $1.33 \times 10^4$ Pa or less, preferably $1.33 \times 10^3$ Pa or less and a temperature in a range from 170 to 220° C. for about 3 to 48 hours.

An advantage of the polycondensation is in that it is possible to increase the intrinsic viscosity as well as to reduce an amount of linear oligomer to 2 wt % or less, preferably to 1 wt % or less because the oligomer having the sublimating property escapes from the polymer during the solid-state polymerization. Also, as far as using the prepolymer obtained by the inventive method, the hue of CD-PTT hardly deteriorates due to the solid-state polymerization. Further, it is possible to largely reduce the amount of terminal carboxyl groups relative to the prepolymer obtained by the melting polymerization, resulting in CD-PTT excellent in melting stability and whiteness.

Next, a favorable method for the production will be described when terephthalic acid is used.

The inventive CD-PTT is produced by a method comprising the steps of: reacting terephthalic acid, which is a main dicarboxylic acid component, with 1,3-propanediol, which is a main diol component, to form 1,3-propanediol ester of terephthalic acid and/or oligomer thereof; after completing the polycondensation reaction, solidifying the resultant polymer; and heating the polymer in a solid state to increase an intrinsic viscosity thereof by 0.1 dl/g or more from that at a time when the polycondensation reaction has completed, and the method satisfies the following conditions (a) to (c):

(a) a molar ratio of 1,3-propanediol to terephthalic acid is in a range from 0.8 to 2.5, (b) in the reaction of terephthalic acid with diol mainly composed of 1,3-propanediol, at a stage wherein a rate of reaction of terephthalic acid is in a range from 75 to 100%, an amount of ester-forming sulfonate corresponding to a range from 0.5 to 5 mol % of total dicarboxylic acid component is added, and (c) an amount of terminal carboxyl groups of PTT copolymer is in a range from 5 to 40 milli-equivalent per kg resin before the initiation of solid-state polymerization.

The inventive method for producing CD-PTT includes the esterification reaction for condensating terephthalic acid with 1,3-propanediol to form 1,3-propanediol ester of terephthalic acid and/or oligomer thereof, the polycondensation reaction for obtaining prepolymer by heating the resultant polycondensate to remove 1,3-propanediol, and the solid-state polymerization reaction of the prepolymer.

First, the esterification reaction will be described.

It is necessary that a charging ratio of 1,3-propanediol to terephthalic acid which is a raw material is in a range from 0.8 to 2.5 in molar ratio. If the charging ratio is less than 0.8, the esterification process does not completely proceed. Contrarily, if the charging ratio is more than 2.5, the melting point becomes lower and the whiteness of the resultant polymer deteriorates. The range is preferably from 0.8 to 1.5, more preferably from 1 to 1.3.

Kinds and amounts of catalyst or conditions of the esterification reaction preferably used for facilitating the esterification reaction are the same as in the esterification reaction using a lower alcohol ester of terephthalic acid already described. In this regard, one material removed from the reaction system is water.

An amount of the ester-forming sulfonate corresponding to 0.5 to 5 mol % of a total dicarboxylic acid component is necessarily added at a stage in that a rate of reaction of terephthalic acid is in a range from 75 to 100% for obtaining the inventive CD-PTT. If the rate of reaction is less than 75%, the copolymerization ratio of BPE becomes larger to be outside the range according to the present invention. This is because, if the rate of reaction is low, an amount of protons originated from unreacted terephthalic acid increases to accelerate the formation of BPE. The addition is preferably carried out when the rate of reaction is 90% or more, most preferably when the esterification reaction has completed 95% or more. A method for adding ester-forming sulfonate is the same as when the lower alcohol ester of terephthalic acid is used.

After the esterification reaction has completed, the polycondensation reaction and the solid-state polymerization are carried out, conditions and additives of which are the same as in the polycondensation reaction when the lower alcohol ester of terephthalic acid is used as already described.

A high-molecular weight CD-PTT thus obtained is spun into a fiber by a known spinning method, which fiber is dyeable with cationic dye and is very excellent in color development and clarity in comparison with a known CD-PTT fiber, because the raw material polymer is good in whiteness. Particularly, by adopting the following spinning method, a fiber which is an object of the present invention high in toughness and excellent in processability, and not excessively shrinking during the treatment, is obtainable.

That is, the favorable inventive CD-PTT fiber is a fiber wherein ester-forming sulfonate in a range from 0.5 to 5 mol % is copolymerized relative to a total dicarboxylic acid component, and the fiber satisfies the following conditions (A) to (C):

(A) an intrinsic viscosity [η] is in a range from 0.65 to 1.4 dl/g, (B) a peak temperature of a dynamic loss tangent is in a range from 105 to 140° C., and (C) a boiling water shrinkage is in a range from 0 to 16%.

It is necessary that the inventive CD-PTT fiber has an intrinsic viscosity in a range from 0.65 to 1.4 dl/g. A high-toughness fiber is obtainable when the intrinsic viscosity is within this range. If the intrinsic viscosity is less than 0.65 dl/g, a satisfactory toughness is not achievable because the degree of polymerization is too low. Contrarily, if the intrinsic viscosity exceeds 1.4 dl/g, the melting viscosity becomes excessively high during the spinning process, whereby a melt fracture or others may occur to be an uneven fiber poor in toughness. Also, even if the spinning conditions are regulated, it is difficult to release a molecular stress, resulting in a high boiling water shrinkage. The intrinsic viscosity of fiber is preferably in a range from 0.68 to 1.3 dl/g, particularly preferably from 0.7 to 1.2 dl/g.

It is necessary that the peak temperature of the dynamic loss tangent (herein after referred to as Tmax) of the inventive CD-PTT fiber is in a range from 105 to 140° C. Tmax is a value obtained by the measurement of dynamic viscoelasticity and corresponds to the denseness in an amorphous portion of the molecule. The larger the value, the denser the structure of the amorphous portion. If Tmax is less than 105° C., there may be a case in which the denseness of the amorphous portion is low to worsen the orientation of molecule in the axial direction of fiber, whereby a toughness of the fiber becomes inferior and a fabric formed of such fibers is liable to break. Contrarily, if it exceeds 140° C., the denseness in the amorphous portion of the molecule becomes too high for the cationic dye to migrate into the fiber, whereby it is difficult to provide a deep color dyed product. In order to improve both the toughness and the color development of the dyed product, Tmax is particularly preferably in a range from 110 to 120° C.

It is necessary that the boiling water shrinkage (hereinafter referred to as BWS) of the inventive CD-PTT is in a range from 0 to 16%. Since the molecule is in an excessively stressed state if the BWS exceeds 16%, the resultant fabric is largely shrunk during a subsequent processing such as a dyeing process to have a hard touch which is contradictory to a soft touch inherent in the PTT fiber. Contrarily, if the BWS is less than 0%, that is, when the fiber extends in boiling water, there may be a case wherein a fabric free from wrinkles is not obtainable even though it is heat-treated. BWS is preferably in a range from 3 to 15%, more preferably from 5 to 14%.

The elongation at break of the inventive CD-PTT fiber is preferably in a range from 20 to 70%. To improve the fiber toughness and prevent fluff or yarn breakage from occurring during the drawing or subsequent processing process, the elongation at break is preferably 20% or more. To improve the fiber toughness so that the uniform drawing is possible to obtain fibers small in size irregularity, the elongation at break is preferably 70% or less. The elongation at break is more preferably in a range from 25 to 65%, furthermore preferably from 30 to 60%, particularly preferably from 35 to 55%.

The toughness of the inventive CD-PTT fiber is preferably 16 or more. The toughness is calculated by the following equation:

$$\text{Toughness} = [\text{Strength } (cN/dtex)] \times [\text{Elongation } (\%)]^{1/2}$$

If the toughness is 16 or more, the resultant fabric is difficult to tear. The upper limit of the toughness is not be restricted, but a higher value is better. To make the best use of the effect of high molecular weight of the inventive CD-PTT and sufficiently exhibit the durability and stiffness of the resultant fiber product, the toughness is preferably 17.5 or more, more preferably 18 or more, most preferably 19 or more.

The tensile strength of the inventive CD-PTT fiber is preferably 2.2 cN/dtex or more. Since the strength is excessive low if this value is less than 2.2 cN/dtex, it is necessary to increase the elongation when the toughness is to be increased, which is liable to cause a so-called "irreversible shaping" in which a portion of the fabric to which a force has been applied upon the formation of the fabric remains deformed. The tensile strength is more preferably 2.4 cN/dtex or more, furthermore preferably 2.6 cN/dtex, particularly preferably 2.8 cN/dtex or more.

The elastic recovery at 20% elongation of the inventive CD-PTT fiber is preferably 60% or more for the purpose of achieving the excellent stretchability inherent to PTT., more preferably 65% or more, particularly preferably 70% or more.

The density of the inventive CD-PTT fiber is preferably 1.330 g/cm$^3$ or more. The density is an index representing the crystallinity of the fiber. The higher the density, the higher the crystallinity of the fiber. To enhance the crystallinity and exhibit the excellent stretchability inherent to PTT, as well as to sufficiently fix the molecule by the crystallization so that BWS is within a preferable range defined by the present invention, the density is 1.330 g/cm$^3$ or more. On the other hand, since the crystalline density of PTT is 1.431 g/cm$^3$ (see, Material, Vol. 35, No. 396, page 1067, published in 1986), it is thought that the upper limit of the density of the copolymerized CD-PTT cannot exceed this value. The density is more preferably 1.335 g/cm$^3$ or more, furthermore preferably 1.340 g/cm$^3$ or more.

Figure 1:
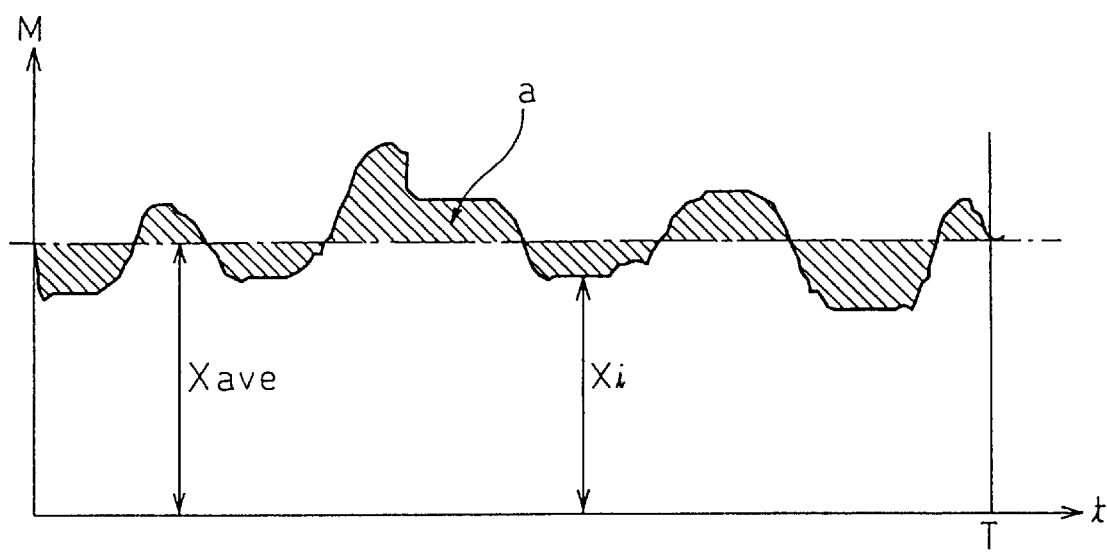
FIG. 1 illustrates an unevenness curve (representing the variation of fiber weight) when a fiber passes through an USTER TESTER 3, wherein M represents a mass, t represents a time, Xi represents an instantaneous value of weight, Xave is an average value thereof, T represents a measuring time and a represents an area between Xi and Xave (a hatched portion)

The U % of the inventive CD-PTT fiber is preferably in a range from 0 to 3%. When the fiber passes through an USTER TESTER 3 at a constant speed, a curve of the unevenness of the fiber size (the variation of fiber weight) illustrated in FIG. 1 is obtained. The U % is obtainable based on this result in accordance with the following equation (1). The U % is preferably 2% or less, more preferably 1.5% or less on account of suppressing fluff or yarn breakage during the subsequent processing and minimizing the irregularity in mechanical properties and the uneven dyeing.

$$U \% = [a/(Xave \times T)] \times 100 \tag{1}$$

wherein, in FIG. 1, Xave is an average value, a is an area between an instantaneous value (Xi) of a weight and Xave (a hatched portion) and T is a measurement time.

The hue of the inventive CD-PTT fiber is preferably in a range from −30 to 5 as represented by a YI value (yellowness) and in a range from 50 to 150 as represented by a WI value (whiteness). If the hue is within this range, it is possible to easily obtain a dyed fabric of a desired color excellent in color development when the fabric is dyed with a light color. To obtain the hue within such a range, it is important that the whiteness of the polymer satisfies the b* value and the L value within a range defined by the present invention and the melting and extrusion temperature is within a range defined by the present invention to suppress the discoloration due to heat decomposition. The YI value is more preferably in a range from −20 to 4.5, furthermore preferably from −10 to 3. Also, the WI value is more preferably in a range from 60 to 100, furthermore preferably from 70 to 90.

The inventive CD-PTT fiber may be of any configuration including a multifilamentary yarn, staple fibers, short fibers, a spun yarn or a monofilamentary yarn in accordance with uses thereof. It may also be a false-twist textured yarn and a twisted yarn. While there is no limitation in a total fiber size, it is usually in a range from 5 to 1000 dtex, preferably from 10 to 300 dtex. Also, while there is no limitation in a single-fiber size, it is usually in a range from 0.1 to 20 dtex, preferably from 0.5 to 10 dtex, furthermore preferably from 1 to 5 dtex. Particularly, a fiber size of the monofilamentary yarn may be suitably selected between 5 and 10000 dtex in accordance with uses thereof.

A cross-section of the fiber may be of any shape, including a circular, triangular, polygonal, flat, L-shaped, W-shaped, cross-shaped, #-shaped and dog bone-shaped cross-section. Also, the fiber may be either a solid one or a hollow one. Provided the object of the present invention is achievable, two kinds or more of polymers different in content of delusterant or intrinsic viscosity may be used to form a composite fiber of a sheath-core type, a side-by-side type or a laminated type or used as mixed fibers having different cross-sectional shapes or polymer kinds.

The inventive CD-PTT fiber may be wound in any package shape such as a pirn or a cheese.

Figure 2A:
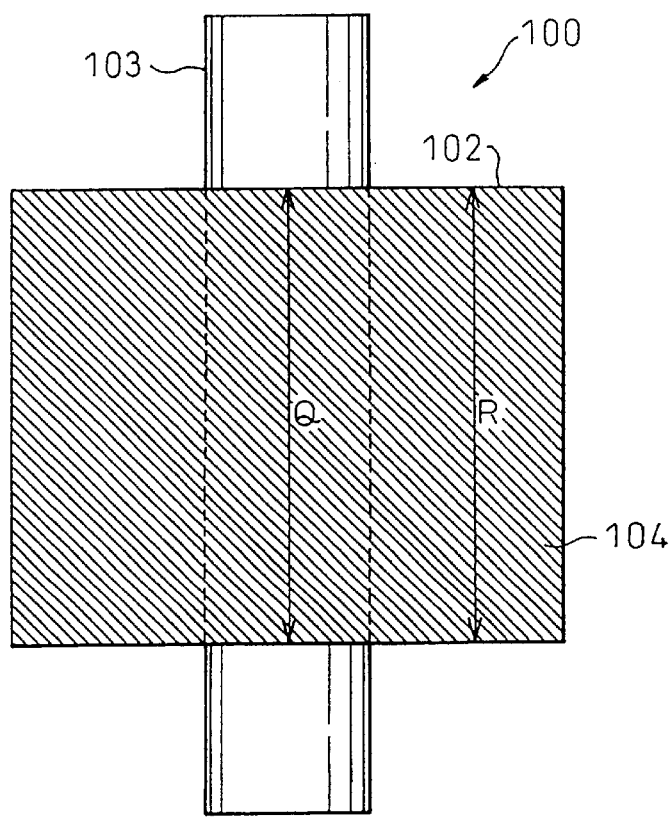
FIG. 2(A) is a schematic illustration of a desired cheese-shaped package of a PTT fiber wound on a bobbin.
Figure 2B:
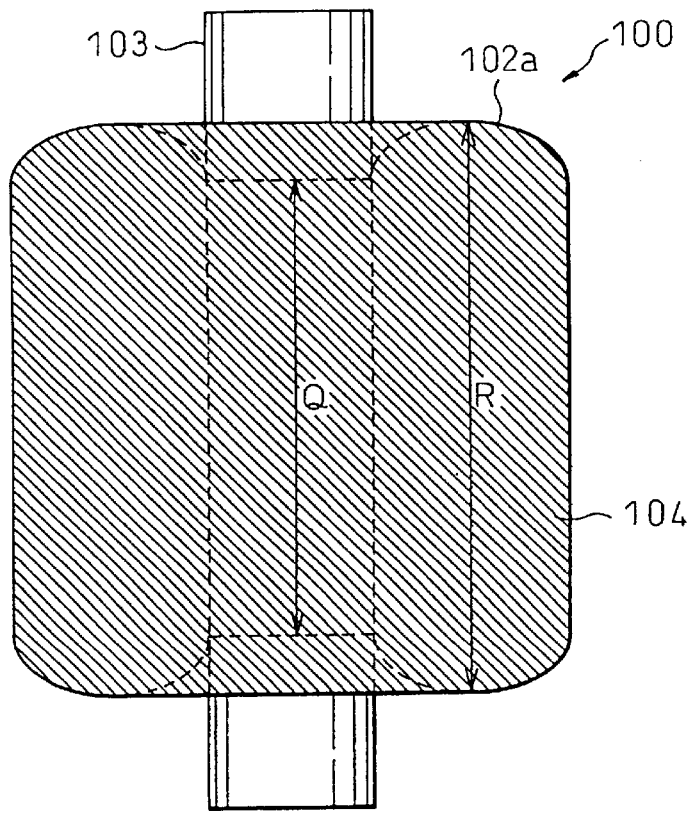
FIG. 2(B) is a schematic illustration of an undesired cheese-shaped package having a bulge.

The cheese-shaped package preferably has a bulging ratio of 20% or less. FIG. 2(A) illustrates the cheese-shaped package (100) wound in a desirable form. A yarn is wound on a core (103) such as a bobbin as cylindrical layers (104) so that a flat end surface (102) is formed on the respective end side of the package. As shown in FIG. 2(B), a bulge may be formed on the respective end side (102a) of the package (100) if the yarn wound on the bobbin slips on the yarn layer by a tightening force caused by the shrinkage of the wound yarn. The bulging ratio is a value calculated by the following equation:

$$\text{Bulging ratio} = \{(R-Q)/Q\} \times 100$$

wherein Q is a winding width of the innermost yarn layer and R is a winding width of the most bulging portion shown in FIG. 2(A) or 2(B).

The cheese-shaped package having the bulging ratio of 20% or less is easily obtainable by controlling the intrinsic viscosity, Tmax and BWS to be within the ranges defined by the present invention. The cheese-shaped package having the bulging ratio exceeding 20% is liable to deform during the transportation whereby the yarn is incapable of being unwound therefrom in the subsequent process or yarn breakage, fluff or uneven dyeing may occur due to the irregularity of unwinding tension. In the worst case, transportation becomes impossible because the bulged end surface of the package protrudes outward farther from the bobbin end. Also, as the tightening force becomes large, there may be a case in which the removal of the package from a spindle of the winder becomes impossible.

The bulging ratio is preferably 15% or less, more preferably 10% or less, most preferably 0%.

To lower a level of the unwinding tension and suppress the fluctuation thereof, the cheese-shaped package preferably has the winding width Q in a range from 40 to 300 mm and a diameter of the bobbin in a range from 50 to 250 mm.

Next, a favorable method for producing the inventive CD-PTT will be described below.

Basically, the inventive CD-PTT fiber is produced by a method for producing a PTT copolymer fiber by melt-spinning PTT wherein ester-forming sulfonate in a range from 0.5 to 5 mol % is copolymerized with a total dicarboxylic acid component to have an intrinsic viscosity in a range from 0.65 to 1.5 dl/g, characterized in that the PTT is extruded from a spinneret having a surface temperature in a range from 250 to 295° C., and after being cooled and solidified, taken up at a speed in a range from 100 to 3000 m/min to be an undrawn yarn which is then drawn at a temperature in a range from 30 to 90° C. and a draw ratio which is in a range from 30 to 99% of the maximum draw ratio and then heat-treated at a temperature from 100 to 200° C. As the CD-PTT, one defined by claim 1 of the present invention is most preferably used.

According to the method for producing the inventive CD-PTT fiber, either a conventional method wherein the undrawn yarn is wound as a package and thereafter drawn to a drawn yarn or a so-called spin-draw take-up method (hereinafter referred to as SDTU method) wherein the undrawn yarn is not wound as a package but continuously drawn may be used. In the conventional method, the taking-up process of the undrawn yarn is to wind the yarn by the winder 12 as shown in FIG. 3, while in the SDTU method, to wind up the yarn on a first roll 18 as shown in FIG. 5. Since both the methods are identical from the drying to the taking-up of the undrawn yarn, the explanation will be made with reference to FIG. 3.

CD-PTT dried by a drier 1 to have a moisture content of 100 ppm or less is supplied to an extruder 2 adjusted to a temperature in a range from 250 to 290° C. and melted. The melted CD-PTT is supplied to a spin head 4 adjusted to a temperature in a range from 250 to 295° C. and measured through a gear pump. Thereafter, it is extruded from a spinneret 6 having a plurality of orifices and mounted to a spinning pack 5. The moisture content of CD-PTT to be supplied to the extruder is preferably 50 ppm or less, more preferably 30 ppm or less on account of suppressing the decline of the polymerization degree.

A first important point for producing the inventive CD-PTT fiber is to prepare an undrawn yarn high in polymerization degree and low in molecular orientation and crystallinity so that the drawing is facilitated.

To obtain the undrawn yarn high in polymerization degree, it is preferable to use the polymer high in molecular weight and excellent in melting stability such as the inventive CD-PTT and to lower the melting temperature to suppress the decomposition of the polymer. If the decomposition is significant, there may be a problem of discoloration of the fiber. On the other hand, to obtain an undrawn yarn good in drawability, it is necessary to completely melt the polymer at a high melting temperature so that the entanglement of molecular chains disturbing the drawing is sufficiently loosened. Particularly, since the entanglement is significant in the polymer having a high polymerization degree, the melting temperature is preferably made to rise.

To compromise both the requisites with each other, it is preferable to select a special range of the temperature. That is, the temperature of the extruder is preferably in a range from 250 to 280° C., more preferably from 255 to 275° C., furthermore preferably from 260 to 270° C.; the temperature of the spin head is preferably in a range from 260 to 295° C., more preferably from 265 to 290° C., furthermore preferably from 270 to 285° C.; and the temperature of the spin head is preferably higher by 5° C. or more than that of the extruder. Since the temperature of the spin head is closely related also to the surface temperature of the spinneret described later, the former is preferably selected within the above range so that the latter becomes a proper value.

Next, as the molecules are liable to be orientated while the polymer is extruded, cooled and solidified and the resultant fiber is taken up because the interaction between molecules is strong in the CD-PTT having a high polymerization degree, it is necessary to suppress the molecular orientation to lower the degree of orientation of the undrawn yarn. This is very important in the present invention. To lower the degree of orientation of the undrawn yarn, it is necessary to make the polymer to be in a state wherein the molecular interaction is minimized beneath the spinneret and to prevent the abrupt deformation of the molecule from occurring. To do so, it is necessary to make the surface temperature of the spinneret to be high so that the temperature of the extruded polymer rises, which polymer is then slowly solidified so that the thinning speed, i.e., the deformation speed of the polymer, is low.

Accordingly, in the present invention, it is one of important points that the surface temperature of the spinneret is in a special range from 250 to 295° C. If the surface temperature of the spinneret is lower than 250° C., there is a problem in that yarn breakage or fluff may frequently occur or the yarn unevenness may generate. Contrarily, if the surface temperature of the spinneret exceeds 295° C., the heat decomposition becomes significant to lower the degree of polymerization or cause the discoloration of the undrawn yarn. The surface temperature of the spinneret is preferably in a range from 255 to 290° C., more preferably from 260 to 285° C.

To obtain such a surface temperature of the spinneret, the temperature of the spin head is maintained within a proper range and a heating tube is preferably disposed directly beneath the spinneret. If the temperature of the spin head is excessively high so that the surface temperature of the spinneret rises, the heat decomposition becomes significant to discolor the resultant fiber or lower the degree of polymerization. By using the heating tube, it is possible to suppress the heat decomposition of the polymer as well as make the surface temperature of the spinneret and the atmospheric temperature beneath the spinneret to rise so that the extruded polymer is prevented from abruptly being cooled and solidified.

The temperature of the heating tube is preferably in a range from 100 to 350° C., more preferably from 150 to 300° C., furthermore preferably from 200 to 250° C. A length of the heating tube is preferably in a range from 50 to 300 mm, more preferably from 100 to 250 mm in view of the effect for loosening the entanglement between polymer molecules and the workability of the spinning operation.

To lower the deformation speed of the polymer, a draft ratio is preferably reduced. The draft ratio during the spinning process is preferably in a range from 10 to 2000. In this regard, the draft ratio during the spinning process is a value represented by the following equation:

Draft ratio during the spinning process=($V2$)/($V1$)

wherein $V1$ is a linear speed (m/min) of the polymer when extruded from the spinning orifice, and $V2$ is a peripheral speed (m/min) of the first roll (or a winding speed if the first roll is not used).

If the draft ratio is less than 10, which means that a diameter of the spinning orifice is too small, an extrusion pressure becomes higher to result in melt fracture or others, whereby uniform extrusion is difficult. Contrarily, if the draft ratio exceeds 2000, the deformation speed of the polymer becomes larger, whereby the degree of orientation of undrawn yarn is liable to increase. The spinning draft is more preferably in a range from 50 to 1500, furthermore preferably from 100 to 1000, particularly preferably from 150 to 500.

The spinning orifice used in the present invention preferably has a diameter in a range from 0.2 to 0.7 mm and a ratio of the diameter to a length is in a range from 1:0.25 to 1:3. If the diameter is less than 0.2 mm or the ratio of the diameter to the length exceeds 3, the extrusion pressure rises to result in the melt fracture or others, whereby the uniform extrusion is disturbed. Contrarily, if the diameter exceeds 0.7 mm, as the unevenesss of the fiber becomes significant or the draft ratio becomes higher to increase the degree of orientation of the fiber, there may be a case wherein the drawability is liable to be poor. If the ratio of the diameter to the length is less than 0.25, there may be a case wherein the orifice is deformed or chipped while used for a long period. The orifice diameter is more preferably in a range from 0.25 to 0.6 mm, furthermore preferably from 0.3 to 0.5 mm. The ratio of the diameter to the length is more preferably from 1:0.5 to 1:2, furthermore preferably from 1:0.75 to 1:1.5.

The polymer extruded from the orifice is cooled and solidified to form a fiber. The cooling is preferably carried out by applying cold air at 0~40° C. to the polymer.

While the cooled and solidified fiber may be directly wound, it may preferably be wound by the winder via the first roll shown in FIG. 3 or after being taken up by the first roll shown in FIG. 5, it may be subsequently drawn.

According to the present invention, it is important that a winding speed or a takeup speed on the roll is in a range from 100 to 3000 m/min (hereinafter, the "takeup speed" stands for both a speed for winding the undrawn yarn and a speed for taking the fiber up to the roll). The orientation of the undrawn yarn could readily be restricted by using the takeup speed in such a range. As the extruded polymer falls due to its own weight, it is difficult to control the takeup speed at less than 100 m/min. On the other hand, if the takeup speed exceeds 3000 m/min, the deformation speed of the polymer becomes large and an air resistance increases, whereby it is difficult to suppress the orientation of the undrawn yarn.

The takeup speed is preferably in a range from 300 to 2000 m/min, more preferably from 600 to 1600 m/min, particularly preferably from 800 to 1200 m/min.

The undrawn yarn in the present invention preferably has an elongation at break in a range from 150 to 600%, and a crystallization peak temperature in a range from 64 to 80° C. If the elongation at break is less than 150%, the molecular entanglement is significant, whereby it is difficult to sufficiently draw and orientate the fiber so that the breakage energy increases. Contrarily, if the elongation at break exceeds 600%, the undrawn yarn becomes brittle, whereby it is difficult to draw the yarn in a stable state due to yarn breakage. The elongation at break is more preferably in a range from 180 to 500%, particularly preferably from 200 to 400%.

The crystallization peak temperature is a peak top temperature appearing in a thermal analysis of the undrawn yarn carried out at 20° C./min by using an input compensation type differential scanning calorimeter. Since the undrawn yarn is crystallized at a lower temperature as the regularity of the molecule in the undrawn yarn becomes higher, the crystallization peak temperature is lower. According to the present invention, since it is desirable to draw the undrawn yarn at a draft ratio as high as possible while avoiding the crystallization, the crystallization peak temperature is preferably as high as possible. If the crystallization peak temperature is lower than 64° C., the fiber immediately crystallizes during the drawing process and is difficult to be drawn at a high ratio. According to the inventive CD-PTT, the crystallization peak temperature does not exceed 80° C. The crystallization peak temperature is more preferably in a range from 66 to 80° C., furthermore preferably from 68 to 80° C.

The cooled and solidified fiber is preferably imparted with a finishing agent by an applicator 9 before it is taken up. The finishing agent facilitates the cohesion of the filaments, antistatic properties and slipperiness of the fiber and prevents fluff or yarn breakage from occurring during the winding or subsequent processing process. The finishing agent is an aqueous emulsion in which oil is emulsified by using an emulsifier, a solution in which oil is dissolved with solvent or oil itself, and improves the cohesion of the filaments, antistatic properties and slipperiness of the fiber. The oil is preferably a mixture of fatty ester, mineral oil and one kind or more of polyether having a molecular weight in a range from 1000 to 20000, a sum of which is in a range from 40 to 90 wt %, and if necessary, components thereof may be preferably selected.

According to the present invention, the oil is preferably imparted to the fiber as an aqueous emulsion having a concentration in a range from 1 to 50 wt %. By using the aqueous emulsion type oil, it is possible to avoid the irregular adhesion of oil or improve the winding form of the package. The concentration of the aqueous emulsion is more preferably in a range from 5 to 40 wt %, particularly preferably from 10 to 30 wt %. When the concentration of oil is low, a large amount of finishing agent must be imparted to the fiber. If the concentration is less than 1 wt %, an amount of finishing agent to be imparted to the fiber becomes too large. Contrarily, if the concentration exceeds 50 wt %, the finishing agent has a high viscosity whereby the uniform application thereof to the fiber is difficult.

The oil is preferably adhered to the fiber in a range from 0.2 to 3 wt % relative to a mass of fiber. If the oil is less than 0.2 wt %, the effect of the oil is small whereby fibers in the yarn are loosened due to static electricity or yarn breakage or fluff may occur due to friction. If it exceeds 3 wt %, the running resistance of the fiber becomes large and the oil may adhere to rolls, a hot plate or guides to contaminate the same. The oil is preferably adhered to the fiber in a range from 0.25 to 2.5 wt % relative to a weight of fiber, more preferably from 0.3 to 2 wt %. Of course, part of the oil may penetrate into the interior of fiber.

The finishing agent may be imparted by a known method using an oiling roll or a guide nozzle as disclosed, for example, in Japanese Unexamined Patent Publication (Kokai) No. 59-116404. Particularly, the method using the guide nozzle is favorable in view of reducing the generation of yarn breakage or fluff due to the friction of the finishing agent applicator itself.

In the conventional method, the undrawn yarn is preferably taken up while controlling a winding tension by using two or more sets of takeup rolls such as the first roll 10 or the second roll 11 shown in FIG. 3. As a result, a package shape of the undrawn yarn becomes good, whereby the tension fluctuation is reduced when the undrawn yarn is unwound during the drawing process and a uniform and high quality fiber free from fluff or yarn breakage is easily obtainable. A winding tension of the undrawn yarn is preferably in a range from 0.04 to 0.3 cN/dtex, more preferably from 0.05 to 0.2 cN/dtex, particularly preferably from 0.06 to 0.15 cN/dtex.

Next, a method for drawing the undrawn yarn will be described.

A second important point for producing the inventive fiber is to draw the above-mentioned undrawn yarn, having a low degree of orientation, at a proper draw ratio. To do so, it is necessary to carry out the drawing at a draw ratio in a range from 30 to 99% of the maximum draw ratio. In this respect, the maximum draw ratio is a largest draw ratio at which fibers are not broken when they are drawn by the same drawing machine as used in the actual fiber production process at the same condition as adopted therein. If the draw ratio exceeds 99% of the maximum draw ratio, the yarn breakage occurs to disturb the stable drawing. Contrarily, if the draw ratio is less than 30% of the maximum draw ratio, uniform drawing becomes difficult to result in fibers with large size fluctuations. The draw ratio is preferably in a range from 50 to 95% of the maximum draw ratio, more preferably from 60 to 90%.

A temperature for carrying out such a drawing is preferably in a range from 30 to 90° C. In this regard, the temperature for carrying out the drawing is a temperature for heating the fiber prior to being drawn, which corresponds to a temperature of the first draw roll in the conventional method (FIG. 4) or that of the first roll in the SDTU method (FIG. 5). By controlling the drawing temperature within this range, it is possible to easily restrict the generation of yarn breakage or fluff during the drawing process to achieve a high ratio drawing and to obtain the inventive fiber having a large breakage energy. The drawing temperature is more preferably in a range from 45 to 80° C., particularly preferably from 55 to 75° C.

The drawn fiber is preferably subjected to a heat treatment so that it is crystallized to have a low shrinkage and a high strength. The heat treatment is preferably carried out continuously to the drawing to simplify the production process.

The heat treatment temperature is preferably in a range from 50 to 200° C. and the heat treatment time is preferably in a range from 0.001 to 1 second. If this time is shorter than 0.001 second, the fiber does not sufficiently crystallize, whereby the fiber structure is not fixed and it is difficult to lower the shrinkage or increase the breakage energy of the fiber. On the other hand, if it exceeds 200° C., yarn breakage or fluff may occur, whereby it is difficult to continuously draw the fiber. The heat treatment temperature is preferably in a range from 60 to 180° C., more preferably from 80 to 160° C.

While the heat treatment time may be long, it is preferably shorter than 1 second when the fiber is continuously drawn and heat-treated in view of the productivity and a size of the installation. Since the degree of crystallization is determined by the heat treatment temperature and the heat treatment time, the temperature and time are preferably selected in accordance with the drawing speeds.

When the fiber is produced by the conventional method, a draw twister usually used for producing PET or nylon fiber by the conventional method or a roll type drawing machine may be adopted for carrying out the drawing.

One example of the conventional method used for drawing the undrawn yarn will be described with reference to FIG. 4.

The undrawn yarn 13 obtained by the conventional method is drawn between first and second draw rolls heated at the above-mentioned drawing temperature, and heat-treated by a hot plate 15 heated at the above-mentioned heat-treatment temperature. Thereafter, the yarn is wound by a winder 17. A drawing pin for fixing a drawing point, a device for interlacing the fibers or rolls or guides for deflecting the fibers may be provided in the yarn passage. Also, the twisting is preferably carried out simultaneously with the winding.

Next, one example of the SDTU method for producing the fiber will be described with reference to FIG. 5.

The undrawn yarn taken up by a first roll 18 heated at the above-mentioned drawing temperature is then wrapped around a second roll 19 heated at the above-mentioned heat-treatment temperature, whereby the drawing is carried out between the first roll 18 and the second roll 19 rotating at a speed higher than that of the first roll 18. At this time, the heat treatment is also carried out at the second roll, and then the yarn is wound by a winder 21 rotating at a speed lower then the second roll. Reference numeral 20 denotes free rolls driven by other rolls.

It is important that the speed of the first roll 18 is within the above-mentioned range of the speed for taking up the undrawn yarn. While the speed of the second roll 19 is decided by the draw ratio, it is usually in a range from 600 to 6000 m/min.

The fiber being drawn and heat-treated is wound by the winder 21.

While the winding speed is decided by the draw ratio and the relax ratio, it is usually in a range from 600 to 6000 m/min.

The speed of the winder 21 is preferably lower than the speed of the second roll 19 in the SDTU method. When the inventive CD-PTT fiber is produced so that the speed of the winder 21 is equal to that of the second roll 19, the wound fiber contracts to tighten the bobbin due to its shrinkage force, whereby there may be a case in which the cheese-shaped package cannot be removed from a spindle of the winder even though an amount of fiber is as small as 1 kg or less, or the winding contraction, i.e., the bulging ratio of 20% or more occurs in the package. As a result, a desirable fiber is hardly obtainable or the unwinding tension of the fiber released from the package becomes higher and largely fluctuates to disturb the stable subsequent processing. Contrarily, if the speed of the winder is lower than that of the second roll, it is possible to suppress the winding contraction of the resultant package.

The relax ratio (the speed of the winder/the speed of the second roll) is preferably in a range from 0.8 to 0.999, more preferably from 0.83 to 0.99, furthermore preferably from 0.85 to 0.95. Even if such a relax ratio is adopted, however, the winding contraction may occur when an amount of the wound fiber exceeds 2 kg. In such a case, if a bobbin made of resin, metal or thick paper having a high strength is used for preventing the bobbin from deforming due to the winding contraction, the package is easily be removable from the spindle of the winder. One of effective methods for restricting the winding contraction is to wind a small amount of the yarn as 2 kg or less to form a package. To restrict the winding contraction, the fiber is preferably cooled to 20° C. (a glass transition point of the polymer), or lower, prior to being wound. Since the CD-PTT has a molecule of a zigzagging structure in comparison with, for example, PET, the molecule is liable to be mobile even at a relatively low temperature, whereby it easily shrinks by heat during the winding thereof to often cause a winding contraction. By the above-mentioned cooling operation, the molecular movement is restricted to prevent the winding contraction from occurring. While the yarn temperature after being cooled is preferably as low as possible, it is generally in a range from 10 to 70° C., preferably from 0 to 50° C. While the yarn could be cooled by the application of cooling air or immersion into water or a cooling liquid such as an organic solvent or contact with a low temperature plate or roll, most preferably, a roll for cooling the fiber is disposed between the second roll 19 and the winder 21. By this method, it is possible to obtain a package of 2 kg weight or more, preferably 5 kg weight or more. A tension between the second roll 19 and the winder 21 is preferably in a range from 0.02 to 0.20 cN/dtex. A speed of the winder is preferably regulated to realize the tension in this range.

If the winding is carried out at such a low tension in the prior art melting spinning method for producing PET or nylon, the yarn path becomes unstable and leaves a traverse guide, resulting in yarn breakage or erroneous switching when the yarn is automatically switched from a full bobbin to an empty bobbin. Surprisingly, according to the CD-PTT fiber, such a problem does not occur even though the winding is carried out at such an extremely low tension, but results in a cheese-shaped package of a favorable form which is free from winding contraction. It is thought that a reason for realizing the stable winding even at such a low tension is due to a low elasticity and a high elastic recovery which are a characteristic of the PTT fiber.

If the tension is less than 0.02 cN/dtex, the yarn traverse motion caused by a traverse guide of the winder becomes incorrect because the tension is too weak, resulting in an unfavorable package form or the generation of yarn breakage. Contrarily, if it exceeds 0.20 cN/dtex, the winding contraction is liable to occur even if the fiber is cooled prior to being wound. The winding tension is preferably in a range from 0.025 to 0.15 cN/dtex, more preferably from 0.03 to 0.10 cN/dtex.

According to the present invention, an interlacing treatment may be carried out during the spinning process if necessary. The interlacing treatment may be carried out either before or after the application of the finishing agent or prior to the winding or it may be carried out at a plurality of locations.

The winder 21 used for the present invention may be either of a spindle drive type, a touch roll drive type or a combination drive type in which both the spindle and the touch roll are used. However, the combination drive type is favorable for the purpose of winding a large amount of yarn. In the winder of the touch roll drive type or the spindle drive type, as the spindle or the touch roll not positively driven is frictionally rotated by the other roll, a bobbin mounted to the spindle has a peripheral speed different from that of the touch roll due to slippage between the two. Therefore, when the yarn is wound from the touch roll to the spindle, the yarn is liable to stretch or slacken. Thus, the tension may vary to worsen the package form or damage the yarn by the abrasion. By driving both the spindle and the touch roll, it is possible to control the difference in peripheral speed between the touch roll and the bobbin, reduce the slippage and improve the yarn quality as well as the package form.

A winding angle when the fiber is wound on the bobbin is preferably in a range from 3.5 to 8 degrees. If the winding angle is less than 3.5 degrees, slippage may occur between yarn layers to cause irregular winding (ayaochi; phonetic) or bulging. Contrarily, if it exceeds 8 degrees, an amount of yarn to be wound at the opposite ends of the bobbin increases to result in a package having a larger diameter at the ends than in a middle portion thereof. Such a package is brought into contact with the touch roll solely at the ends, whereby the yarn quality deteriorates in these regions, or the unwinding tension fluctuates when the yarn is released from the package to cause fluff or yarn breakage. The winding angle is more preferably in a range from 4 to 7 degrees, particularly preferably from 5 to 6.5 degrees.

The CD-PTT fiber thus obtained may be used as a staple fiber. A fiber length of the staple fiber is preferably in a range from 3 to 300 mm and a degree of crimp thereof is preferably 5% or more. Such a staple fiber may be favorably used as a clothing material for an inner wear or a sportswear made of spun yarns and an industrial material for a wadding or a non-woven fabric. If the fiber length is less than 3 mm or the degree of crimp is less than 5%, the entanglement of fibers becomes difficult, while if the fiber length exceeds 300 mm, the processability in the spinning process deteriorates. The fiber length is more preferably in a range from 5 to 200 mm, furthermore preferably from 10 to 150 mm. The degree of crimp is more preferably in a range from 8 to 35%.

An elastic recovery at 10% elongation of the staple fiber is preferably 80% or more, more preferably 90% or more. If the elastic recovery is less than 80%, the stretchability becomes inferior. Further, the bending recovery of the staple fiber is preferably 80% or more, more preferably 90% or more. If the bending recovery is less than 80%, the resilience and recovery in volume become poor when used as a wadding or the like.

Such a staple fiber is obtainable by cutting the inventive filamentary fiber after imparting crimps via a stuffer box or by the treatment with hot fluid such as steam jet or by passing through the gear intermesh. Although the filamentary fiber may be imparted with crimps without the preconditioning, the heat treatment is preferably carried out prior to the crimping process for the purpose of facilitating the elastic recovery or the bending recovery. The heat treatment is preferably carried out with a constant length or under a tensional condition. Also, the heat treatment temperature is preferably in a range from 100 to 160° C. and the heat treatment time is preferably in a range from 0.01 to 90 minutes.

The CD-PTT fiber or staple fiber thus obtained may be solely or partially used in a fabric to produce a fibrous product excellent in softness, stretchability and color development.

In this regard, the fibrous product referred to in the present invention is that in which the inventive CD-PTT fiber or staple fiber is used, including a clothing such as an outer wear, an inner wear, a liner or a sportswear and an industrial material such as a carpet yarn, an inner lining, a flock, a back, a car seat or a synthetic leather. A mixing ratio of the inventive CD-PTT fiber or staple fiber in the fibrous product is not particularly limited but may be optionally decided in accordance with purposes thereof. The mixing ratio is usually in a range from 1 to 100%, preferably from 5 to 100%. Since the inventive fiber or staple fiber is high in toughness and small in shrinkage, even if a fabric in which it is solely or partially used is subjected to a heat treatment such as a dyeing, the fabric does not excessively shrink to maintain a very soft hand, and has an excellent burst strength and tearing strength.

When other fibers are used as part of the fabric, there is no limitation of kinds of the other fiber, but if stretch fiber represented by polyurethane elastomer fiber, cellulosic fiber, wool, silk or acetate is mixed therewith, it is possible to impart the resultant fabric with characteristics not obtainable when nylon fiber or PET fiber is used. That is, the resultant fabric is dyeable with cationic dye and/or disperse dye under a normal pressure and has a unique hand rich in softness and stretchability.

The fibrous product obtained according to the present invention has no limitation in shapes or means for weaving or knitting the same, and may be produced by the conventional methods. For example, the inventive fiber or staple fiber may be used as a warp or weft yarn of a woven fabric such as a plain weave fabric or a reversible fabric and a knitted fabric such as a warp knit fabric, a weft knit fabric or a circular knit fabric. Or the inventive fiber may be twisted, plied or interlaced with other fibers.

The present invention will be described in more detail with reference to the preferred embodiments below, but it should be noted that the present invention is not limited thereto.

The measurement and evaluation were carried out as follows:

(1) Intrinsic Viscosity [η]

The intrinsic viscosity (dl/g) was measured by an Ostwald viscometer while using o-chlorophenol at 35° C., so that a ratio of a specific viscosity (asp) obtained thereby to a concentration (C) is extrapolated to a concentration 0 in accordance with the following equation:

$$[\eta] = \lim_{c \to 0}(\eta sp/C)$$

(2) Copolymerization Ratio of BPE

A pulverized polymer, 2 g by weight, was precisely weighed and was added to a methanol solution of 2N potassium hydroxide of 25 ml and hydrolyzed for 4 hours at reflux. The resultant decomposition product was determined by a gas chromatography.

The measurement was carried out by using DURAMBOND DB-WAX; 0.25 mm×30 mm (0.25 μm) under the supply of helium at 100 ml/min while heating from 150 to 230° C. at a rate of 20° C./min.

(3) Melting Point

The melting point was measured by Pyris 1 DSC (input compensation type differential scanning calorimeter) manufactured by Perkin Elmer. A test piece was once heated from a room temperature to 280° C. at a rate of 100° C./min, left stationary for 2 minutes, cooled to 0° C. at a rate of 500° C./min, left stationary for one minute, and heated to 280° C. at a rate of 20° C./min, after which the measurement began. In this regard, the reason why the test piece is melted and then cooled prior to be subjected to the melting point measurement is to cancel the thermal history of the polymer experienced when the same was taken out after the polymerization.

The melting point was defined as a peak value of a melting curve. To avoid the human variance, the peak value was determined by using analysis software attached to the measurement device.

(4) Amount of Terminal Carboxyl Groups

The polymer (resin) of 1 g weight was added with benzylalcohol of 25 ml and heated at 200° C. for 15 minutes in a nitrogen atmosphere. Thereafter, 3 drops of phenolphthalein indicator and 25 ml of chloroform was added thereto. Then, the amount of terminal carboxyl terminal groups (milli-equivalent per kg resin) was determined by the titration with a benzylalcohol solution of potassium hydroxide of 0.02 N.

(5) Hue of Polymer (L Value, b* Value)

The hue of polymer was measured by using a color computer manufactured by SUGA SHIKENKI K.K. The L value indicates the degree of brightness, and the b* value indicates the degree of yellowness. The larger of either of the values, the higher the degree.

(6) Melting Stability 1 g of the resultant polymer was put into a sealed 30 ml glass tube, and vacuum-dried at 130° C. for 24 hours. After the drying, a mouth of the sealed tube was molten while maintaining vacuum in the interior thereof to prevent air from entering from outside. The sealed tube in which the resin is accommodated was immersed in an oil bath maintained at 270° C. for 2 hours. After being melted, the polymer is taken out from the sealed tube. A ratio of the intrinsic viscosity of the polymer after being molten to that of the polymer prior to be molten was calculated as the melting stability.

(7) Esterification Reaction Ratio

A reaction ratio of terephthalic acid in the esterification reaction is defined as the esterification reaction ratio. In such a case, the reaction of terephthalic acid follows the equation described below, wherein if all carboxyl groups in terephthalic acid of 1 mol are reacted, water of 2 mols is formed. Thus, the definition was made so that the esterification reaction ratio is 100% if water of 2 mols is formed. That is, the esterification reaction ratio was determined by an amount of water formed in the esterification reaction.

$$HOOC\phi COOH + HOCH_2CH_2CH_2OH \to \text{terephthalate ester} + 2H_2O$$

wherein φ represents phenylene group.

(8) Peak Temperature of Loss Tangent (Tmax)

A loss tangent (tan δ) and a dynamic viscoelasticity at the each temperature were measured in dry air at a measuring frequency of 110 Hz and at a temperature-rise rate of 5° C./min by using a RHEO-VIBRON manufactured by ORIENTECH K.K. A loss tangent-temperature curve was obtained from this result, and Tmax (° C.) as a peak temperature of the loss tangent was determined on this curve.

(9) Boiling Water Shrinkage (BWS)

The boiling water shrinkage was obtained in accordance with JIS-L-1013 as a hank shrinkage.

(10) Strength (Strength at Break), Elongation (Elongation at Break), Toughness

A TENSILON manufactured by ORIENTECH K.K. which is a constant extension rate type tensile tester was used in accordance with JIS-L-1013 at an extension rate of 20 cm/min and a grab distance of 20 cm.

The toughness was calculated by the following equation based on the strength and elongation measured by the above-mentioned method.

Toughness=[strength $(cN/dtex)$]×[elongation (%)]$^{1/2}$

(11) Elastic Recovery

The elastic recovery was determined by the following equation:

A test piece of fiber was attached to a tensile tester at a chuck distance (L0) of 20 cm and extended to a predetermined elongation value at an extension rate of 20 cm/min, and left stationary for one minute. Thereafter, the fiber was made to contract again at the same rate to depict a stress-strain curve. During the contraction, an extension value at which the stress becomes zero was defined as a residual elongation (La). The elastic recovery was obtained by the following equation:

Elastic recovery=[$(L0-La)/L0$]×100

(12) Birefringence

The birefringence was obtained by the retardation of polarization observed on a surface of the fiber in accordance with Handbook of Fiber (Material section); the 5th edition, page 969, published from MARUZEN K.K in 1978.

(13) Density

The density was measured in accordance with JIS-L-1013 by using a density gradient tube formed of carbon tetrachloride and n-heptane.

(14) U %

The U % was measured under the following conditions by using an USTER TESTER 3 manufactured by ZELLWEGER USTER:

Measurement speed: 100 m/min

Measurement time: 1 min.

Number of Measurements: twice

Type of twist: S twist

(15) Color of Fiber

The color of fiber was measured by using test pieces of a fabric prepared by the following steps. In the measurement, a WI value representative of the degree of whiteness was determined in accordance with ASTM E 313-73, and a YI value representative of the degree of yellowness wad determined in accordance with ASTM D 1925-70 under the following conditions:

[Method for Preparing the Fabric]

1) A sample was knit while feeding a yarn through a single feeder.

2) The sample was scoured in hot water added with Scourol of 2 g/l at 70° C.

3) The sample was heat-set by a tenter at 180° C. for 30 seconds.

[Measurement]

Device: spectrocolorimeter: Macbeth CE-3000 (manufactured by Macbeth)

Measurement condition:

Field of view: 2 degrees

Light source: C (CIE 1964)

Specular gloss: contained

UV ray: contained

Calculation was carried out by the following equations to obtain YI value and WI value:

$YI=100\times(1.28X-1.06Z)/Y$ $WI=4\times0.847Z-3Y$ wherein X, Y and Z are tristimulus values in the X, Y, Z color specification system.

(16) Bulging Ratio

A winding width Q of the innermost yarn layer (104) and a winding width R of the most bulged portion shown in FIG. 2(A) or 2(B) were measured. The bulging ratio was calculated by the following equation:

Bulging ratio (%)={$(R-Q)/Q$}×100

(17) Crystallization Peak Temperature of Undrawn Yarn

The measurement was carried out by using a Pyris 1 DSC (input compensation type differential calorimeter) manufactured by Perkin Elmer under the following conditions, wherein the crystallization peak temperature is defined as a peak value of the heat release derived from the crystallization. The peak value was determined while using an analysis soft ware attached to the measurement device.

Measurement temperature: 0 to 280° C.

Rate of temperature rise: 20° C./min

(18) Oil Pickup

The fiber was scoured with diethylether, and after removing the diethylether, an amount of pure oil adhered to the fiber surface was measured. The oil pickup was determined by dividing the amount of pure oil by the fiber mass.

(19) Degree of Crimp

A length a of a test piece when loaded with an initial load of 0.01764 cN/dtex (0.02 mg/denier) and a length b thereof when loaded with 0.265 cN/dtex (0.3 mg/denier) were measured, from which the degree of crimp was calculated by the following equation:

Degree of crimp (%)=[$(b-a)/b$]×100

The measurement was repeated 10 times and the average value was obtained to be the degree of crimp.

(20) Bending Recovery

A fiber loaded with an initial load of 0.0294 cN/dtex (1/30 mg/denier) was wound around a plate of 30 mm wide, 40 mm long and 40 μm thick five times so that portions of the fiber are not wrapped to each other, and a weight of 1 kg was applied to a bending portion of the fiber. After 30 seconds, the weight was removed, and the fiber was cut at a center of the plate. A recovery angle was measured after 10 minutes and the recovery was calculated.

EXAMPLE 1

1300 g (6.7 mol) of dimethyl terephthalate, 1144 g (15 mol) of 1,3-propanediol, 40.5 g (0.14 mol) of dimethyl 5-sodium sulfoisophthalate, 2.4 g (0.014 mol) of calcium acetate monohydrate and 1.0 g (0.01 mol) of lithium acetate dihydrate were charged in an autoclave of 3 l, in which the ester exchange reaction was carried while removing methanol at 220° C. The ester exchange reaction ratio was 95%. After the completion of the ester exchange reaction, 0.65 g of trimethylphosphate and 1.34 g of titanium tetrabutoxide were added and agitated for 30 minutes. Thereafter, the polycondensation reaction was carried out for 1.5 hours at 270° C. under the degree of vacuum in a range from 13.3 to 66.5 Pa while removing 1,3-propanediol. After the completion of the polycondensation reaction, the resultant molten product was thrown into water to form a rope which was then finely cut to obtain a chip-shaped prepolymer. In this regard, upon the completion of the polycondensation reaction, the melting viscosity becomes higher as the time passes.

The intrinsic viscosity of the prepolymer was 0.54 dl/g and the amount of terminal carboxyl groups was 16 milli-equivalent per kg resin. The solid-state polymerization of the resultant prepolymer was carried out at 215° C. in a nitrogen stream. A speed of the solid-state polymerization of the prepolymer was high and the resultant CD-PTT was excellent in melting stability and exhibited a favorable hue (see Table 1).

The resultant polymer chips were dried to a moisture content of 30% and melted in an extruder at 265° C., which was then fed to a spin head maintained at 285° C. and extruded from a spinneret having 36 circular orifices, each having a diameter of 0.35 mm and a length of 0.35 mm. A heating tube of 100 mm long heated at 250° C. was disposed beneath the spinneret. The surface temperature of the spinneret was 271° C. Then, the resultant undrawn yarn was draw-twisted via a hot roll heated to 60° C. and a hot plate heated to 140° C. at a drawing speed of 600 m/min to obtain a drawn yarn of 56 dtex/36 f having an elongation at break of 40%, an intrinsic viscosity of 0.86, a strength of 2.8 cN/dtex, an elastic modulus of 2.0 cN/dtex, Tmax of 116° C. and BWS of 13.1%.

The resultant fiber was fed to a knitting machine through a single feeder to form a knit fabric which was then dyed with cationic dye. The cationic dye was KAYACRYL BLACK BS-ED (manufactured by NIPPON KAYAKU K.K., 8% omf, a bath ratio of 1:50) and a dispersant was 1 g/l of DISPER TL (manufactured by MEISEI KAGAKU K.K.). A dyeing liquid was prepared by adding the dye to an aqueous solution of 3 g/l of sodium sulfate, in which acetic acid and sodium acetate are added so that the pH is regulated to 4. The fabric was dyed at 120° C. for one hour and was then subjected to a soaping treatment at 70° C. for 15 minutes in a solution of 1 g/l of Senkanol A-900 (manufactured by SENKA K.K.), the bath ratio of which was 1:50. The dye absorption degree was 85%, resulting in a deeply dyed product.

Also, a light-resistance test was carried out by using a fadeometer at 63° C. for 30 hours. A discoloration was hardly seen.

EXAMPLE 2

A prepolymer was obtained in the same manner as in Example 1, except that the polycondensation reaction is carried out at 260° C. for 1.5 hours. The intrinsic viscosity was 0.52 dl/g and the amount of terminal carboxyl groups was 16 milli-equivalent per kg resin. The solid-state polymerization of the resultant prepolymer was carried out at 215° C. in a nitrogen stream. The solid-state polymerization speed of the prepolymer was high, and CD-PTT thus obtained was excellent in melting stability and exhibited a favorable hue (see Table 1).

COMPARATIVE EXAMPLE 1

A prepolymer was obtained in the same manner as in Example 1, except that the polycondensation reaction is carried out at 260° C. for 2 hours. The intrinsic viscosity was 0.58 dl/g and the amount of terminal carboxyl groups was 45 milli-equivalent per kg resin. The solid-state polymerization of the resultant prepolymer was carried out at 215° C. in a nitrogen stream. The solid-state polymerization speed of the prepolymer was lower than that in Example 1, and CD-PTT thus obtained was inferior in melting stability and exhibited an unfavorable hue (see Table 1).

COMPARATIVE EXAMPLE 2

A polymerization test was carried out in the same manner as in Example 1, except that the polycondensation reaction continued for 2.5 hours. From an instant at which the polycondensation reaction had lasted for about 2 hours to the completion of the polycondensation reaction, the melting viscosity was maintained at a low level. It is thought that this is because the growth of molecular chains due to the polycondensation reaction equilibrated with the depolymerization due to the heat decomposition.

The intrinsic viscosity of the prepolymer was 0.60 dl/g and the amount of terminal carboxyl groups was 43 milli-equivalent per kg resin. The solid-state polymerization of the resultant prepolymer was carried out at 215° C. in a nitrogen stream. The solid-state polymerization speed of the prepolymer was lower than that in Example 1, and CD-PTT thus obtained was inferior in melting stability and exhibited an unfavorable hue (see Table 1).

COMPARATIVE EXAMPLE 3

A homo PTT having the intrinsic viscosity of 0.92 was obtained in the same manner as in Example 1, except that dimethyl 5-sodium sulfoisophthalate was not used. As shown in Table 1, in the physical properties of the resultant CD-PTT, amounts of SIPM and BPE were out of the ranges of the present invention.

Also, the hue, particularly the b* value was unfavorable. Although the cause not clear, it is thought that this is because dimethyl 5-sodium sulfoisophthalate was not used. Accordingly, it is thought that ester-forming sulfonate has an effect for facilitating the whiteness of the polymer.

The dyeing test was carried out by using cationic dye in a similar manner as in Example 1. The dye absorption degree was 8%. It was found that the dyeing with cationic dye was not possible unless the ester-forming sulfonate is copolymerized.

EXAMPLE 3

Prepolymer was obtained in the same manner as in Example 1, except that the number of moles was 2.5 mol %. The polymer thus obtained was excellent in melting stability and exhibited a favorable hue (see Table 1).

COMPARATIVE EXAMPLE 4

Dimethyl terephthalate and ethylene glycol (a molar ratio is 1:1.6) were subjected to the ester exchange reaction while using manganese acetate (0.05 wt % of an amount of dimethyl terephthalate) as a catalyst. 0.98 mol of bis (hydroxyethyl) terephthalate thus obtained was added with 0.02 mol of dimethyl 5-sodium sulfoisophthalate and 200 mg of lithium acetate dihydrate together with 125 mg of antimony trioxide as a catalyst (in this case, if titanium tetrabutoxide is used, the resultant polymer is significantly colored) and 130 mg of trimethyl phosphate as a heat stabilizer, and the melting polymerization was carried out at 290° C. under the vacuum in a range from 13.3 to 66.5 Pa. The PET copolymer thus obtained had the intrinsic viscosity of 0.50 dl/g, the melting point of 256° C., the amount of terminal carboxyl groups of 45 milli-equivalent per kg resin and the b* value of 7.8.

After drying, the PET copolymer thus obtained was extruded from a spinning pack having 24 orifices through a sintered filter of 20 $\mu$m mesh at an extrusion rate of 25 g/min. The pressure in the spinning pack rose, in a week, by about $1.96 \times 10^4$ kPa from the initiation of the spinning operation.

On the other hand, in a similar test carried out while using the CD-PTT obtained by Example 1, the pressure in the spinning pack rose, in a week only, by about $2.97 \times 10^3$ kPa from the initiation of the spinning operation.

When dimethyl 5-sodium sulfoisophthalate is copolymerized with poly(ethylene terephthalate), sulfonate is modified to form a large amount of non-fusible aggregate (complex of manganese, 5-sodium sulfoisophthalate and phosphorus compound). It is apparent that the formation of such aggregate is less according to the inventive CD-PTT.

EXAMPLE 4

1300 g (7.8 mol) of terephthalic acid, 911 g (12.0 mol) of 1,3-propanediol, 1.35 g of titanium tetraisopropoxide and 0.13 g of cobalt acetate tetrahydrate were charged in an autoclave of 3 l, in which the ester exchange reaction was carried while removing water at 220° C. by using a fractionating column. The ester exchange reaction ratio was 98%. The ester exchange reaction ratio was calculated from an amount of the removed water.

After the completion of the ester exchange reaction, 47.3 g (0.16 mol) of dimethyl 5-sodium sulfoisophthalate and 1.09 g (0.16 mol) of lithium acetate dihydrate were added as a 15% solution of 1,3-propanediol. A molar ratio of 1,3-propanediol to terephthalic acid (hereinafter referred to as G value) was 1.5. The number of moles of sulfonate corresponds to 2.0 mol % of the total number of moles of carbonic acid.

Next, 0.65 g of trimethyl phosphate was added, and the polycondensation reaction was carried out at the degree of vacuum in a range from 13.3 to 66.5 Pa while removing 1,3-propanediol. After the completion of the polycondensation reaction, the resultant molten product was thrown into water to form a rope which was then finely cut to obtain chip-shaped prepolymer. The resultant polymer was excellent in melting stability and exhibited a favorable hue (see Table 2).

The spinning operation was carried out by using the resultant polymer under the conditions shown in FIG. 3. The obtained fiber (56 dtex/36 f) had a strength of 2.5 cN/dtex, an elongation at break of 35%, an elasticity of 22 cN/dtex, Tmax of 117° C. and BWS of 13.3%.

The resultant fiber was fed to a knitting machine through a single feeder to form a knit fabric which was then dyed with cationic dye in the same manner as in Example 1. The dye absorption degree was 75%, resulting in a deeply dyed product. Also, while a light-resistance test was carried out by using a fadeometer at 63° C. for 30 hours. the discoloration was hardly seen.

A pressure rise in the spinning pack was tested by using this CD-PTT in the same manner as in Comparative example 4. The pressure in the spinning pack rose in a week only about $2.94 \times 10^3$ kPa from the initiation of the spinning operation. When dimethyl 5-sodium sulfoisophthalate is copolymerized with polyethylene terephthalate, sulfonate is modified to form a large amount of non-fusible aggregate. It is apparent that the formation of such aggregate is less according to the inventive CD-PTT.

EXAMPLE 5

The same process as in Example 4 was carried out except for changing the G value. The resultant polymer is excellent in melting stability and exhibited a favorable hue (Table 2).

COMPARATIVE EXAMPLE 5

The same process as in Example 4 was carried out, except that dimethyl 5-sodium sulfoisophthalate was charged in an autoclave together with terephthalic acid prior to the esterification reaction; i.e., before initiating the polymerization. The melting point of the resultant polymer was significantly low, and the melting stability and the hue thereof were unsatisfactory (Table 2).

Even if the polymerization time was further prolonged, the intrinsic viscosity could not reach 0.6 dl/g. Contrarily, the maximum intrinsic viscosity of the polymer obtained in Example 4 reached 0.8 dl/g when the polymerization time is prolonged.

COMPARATIVE EXAMPLE 6

The same process as in Example 4 was carried out, except that the G value was changed to 3.0. The melting point of the resultant polymer was low, and the melting stability and the hue thereof were unsatisfactory (Table 2).

COMPARATIVE EXAMPLE 7

The same process as in Example 4 was carried out, except that dimethyl 5-sodium sulfoisophthalate was added when the esterification reaction proceeded to 60%. The melting point of the resultant polymer was low, and the melting stability and the hue thereof were unsatisfactory (Table 2).

COMPARATIVE EXAMPLE 7

The same process as in Example 4 was carried out, except that the G value was changed to 3.0. The melting point of the resultant polymer was low, and the melting stability and the hue thereof were unsatisfactory (Table 2).

COMPARATIVE EXAMPLE 8

The same process as in Example 4 was carried out, except that dimethyl 5-sodium sulfoisophthalate was added when the esterification reaction proceeded to 60%. The melting point of the resultant polymer was low, and the melting stability and the hue thereof were unsatisfactory (Table 2).

EXAMPLE 6

The CD-PTT obtained in Example 5 was polymerized in a solid state in a nitrogen atmosphere. The resultant polymer was excellent in melting stability and exhibited a favorable hue (Table 2).

EXAMPLE 7

The same process as in Example 4 was carried out, except that dimethyl 5-sodium sulfoisophthalate and lithium acetate dihydrate were added as a solid, not dissolved in 1,3-propanediol. The resultant polymer was excellent in melting stability and exhibited a favorable hue (Table 2).

EXAMPLES 8 to 11

1300 g (6.7 mol) of dimethyl terephthalate, 1144 g (15 mol) of 1,3-propanediol, 40.5 g (0.14 mol) of dimethyl 5-sodium sulfoisophthalate, 2.4 g (0.014 mol) of calcium acetate monohydrate and 1.0 g (0.01 mol) of lithium acetate dihydrate were charged in an 3 liter autoclave, in which the ester exchange reaction was carried while removing methanol at 220° C. Then, 0.65 g of trimethylphosphate, 1.34 g of titanium tetrabutoxide and 0.05 wt % of titanium dioxide to the theoretical amount of polymer were added, after which the polycondensation reaction was carried out for 2 hours at 270° C. under the degree of vacuum in a range from 13.3 to 66.5 Pa while removing 1,3-propanediol.

The obtained prepolymer (having an amount of terminal carboxyl groups of 19 milli-equivalent per kg resin) was further subjected to the solid-state polymerization at 210° C.

in a nitrogen stream to result in the polymers having the intrinsic viscosity shown in Table 3. The b* values of the polymer chips thus obtained were all within a range from −3 to 5 and the L values thereof were 85 or more, which means that the degree of whiteness is excellent.

The resultant polymer chips were dried to a moisture content of 50% and melted in an extruder at 265° C., which was then fed to a spin head maintained at 285° C. and extruded from a spinneret having 36 circular orifices, each having a diameter of 0.35 mm and a length of 0.35 mm. A heating tube of 100 mm long heated at 250° C. was disposed beneath the spinneret. The temperature of the heating tube used, the surface temperature of the spinneret and the spinning draft are shown in Table 3.

Then, the extruded molten filament was cooled and solidified by applying cold air having a temperature of 20° C. and an air speed of 0.4 m/min. Thereafter, an oil containing octyl stearate of 60 wt %, poly(oxyethylene alkylether) of 15 wt % and potassium phosphate of 3 wt % was applied to the filament as an aqueous emulsion finishing agent having a concentration of 20 wt % so that an oil pickup becomes 1.0 wt % relative to the fiber.

The oiled fibers were wound by the winder 12 via the first takeup roll rotated at winding speeds shown in Table 3 so that a tension becomes 0.1 cN/dtex to obtain undrawn yarns. The physical properties of the undrawn yarns thus wound are shown in Table 3. Either of the undrawn yarns had the elongation and the crystallization peak temperature within the preferable range shown in the present invention.

The wound undrawn yarns were drawn by the drawing machine shown in FIG. 4 wherein the first draw roll and the hot plate were controlled at 60° C. and 140° C., respectively, at draw ratios shown in Table 3 to be drawn yarns of 56 dtex/24 filaments.

Physical properties of the resultant fibers were described in Table 5. In either cases, no fluff generated in the spinning and drawing processes. Also, any of the fibers was within the inventive ranges of the physical properties, wherein the shrinkage was low and the toughness was large.

[COMPARATIVE EXAMPLES 9 to 11] (CONVENTIONAL METHOD)

Fibers were produced while using various CD-PTTs in the same manner as in Example 8. Physical properties of the resultant fibers were shown in Table 5.

In Comparative example 9, the polymerization degree of the polymer used was low, whereby the resultant fiber was also low in polymerization degree, toughness and BWS.

In Comparative example 10, as the surface temperature of the spinneret becomes low because no heating tube is provided, the resultant undrawn yarn is low in crystallization peak temperature. A drawn yarn obtained by drawing the undrawn yarn had Tmax lower than 105° C. and BWS exceeding 16%, both being outside the range defined by the present invention. Also, the toughness of the fiber was unsatisfactorily low.

In Comparative example 11, since the takeup speed was too low, both of the elongation and the crystallization peak temperature of the undrawn yarn were also low. A drawn yarn obtained by drawing the undrawn yarn had Tmax lower than 105° C. and BWS exceeding 16%, both being outside the range defined by the present invention. Also, the toughness of the fiber was unsatisfactorily low.

[EXAMPLES 12 AND 13] (SDTU METHOD)

Polymer obtained in Example 8 (see Table 4) was spun into fibers by using a SDTU spinning machine shown in FIG. 5. The spinning operation was carried out in the same manner as in Example 8 except for items described in Table 4, and thereafter, the drying to the application of a finishing agent followed thereto. The fibers applied with the finishing agent were subjected to the drawing, heat treatment and winding processes by using the first and second rolls and winder adjusted to the conditions shown in Table 4 to be drawn fibers of 86 dtex/24 filaments. Physical properties of the resultant fibers are described in Table 5.

Also, to obtain physical properties before the drawing, the undrawn yarns were directly wound at the same speed as that of the first roll. Results of the measurement were shown in Table 4.

In any case, the elongation and the crystallization peak temperature were in the favorable ranges. No fluff was generated in the resultant fiber, and the physical properties of the fibers were within ranges of the present invention, which were low in shrinkage and high in toughness.

A cheese-shaped package of 4 kg weight was easily removed from the spindle of the winder and has the bulging ratio within the range of the present invention, whereby no winding contraction was seen.

[COMPARATIVE EXAMPLE 12] (SDTU METHOD)

A fiber was obtained by the same spinning process as in Example 12, except for the conditions shown in Table 4. The physical properties of the resultant fiber are shown in Table 5.

Since no heating tube was provided in Comparative example, Tmax of the resultant fiber is lower than 105° C. which was outside the range of the present invention. Also, the toughness of the fiber was low. When the fiber of 4 kg weight was wound to form a cheese-shaped package, the winding contraction was significant whereby the removal of the package from the winder spindle was impossible.

Also, to obtain physical properties before the drawing, the undrawn yarn was directly wound at the same speed as that of the first roll. As shown in Table 4, the undrawn yarn had the crystallization peak temperature lower than the preferable range of the present invention.

EXAMPLE 14

The fiber obtained in Example 8 was subjected to a constant-length wet heat treatment at 150° C. for 5 minutes, and then imparted with crimps by a stuffer box type texturing method. The fiber was cut into staple fibers having a length of 60 mm, a degree of crimp of 14% and an elastic recovery of 95%. In this regard, the bending recovery of the crimped fiber prior to the cutting was as good as 90%.

The obtained staple fiber was good in dyeability, soft in hand and excellent in stretchability, which is suitable for a spun yarn and padding.

EXAMPLE 15

A warp knit fabric was knit from the fiber obtained in Example 8 and Loica (polyurethane type elastomeric fiber manufactured by ASAHI KASEI K.K.). The knitting gauge was 28 G, the loop length was 1080 mm/480 courses in the CD-PTT fiber and 112 mm/480 courses in the stretch fiber, and the knitting density was 90 courses/2.54 cm. A mixture ratio of the CD-PTT fiber was 75%.

The resultant fabric was relaxed and scoured at 90° C. for 2 minutes, and dried by dry heat at 160° C. for 1 minute. Then, the fabric was dyed with a dyeing liquid which is an aqueous solution added with KAYACRYL BLACK BS-ED (cationic dye manufactured by NIPPON KAYAKU K.K.) of 8% omf and DISPER TL (a nonionic type activator manufactured by MEISEI KAGAKU K.K.) used as a dispersant of 1 g/l, which was adjusted with sodium sulfate of 3 g/l, acetic acid and sodium acetate so that pH is 4. A bath ratio was 1:50, a dyeing temperature was 105° C., and a dyeing time was 1 hour. After being dyed, the fabric was finished in the conventional procedure.

The resultant dyed fabric was sufficiently dyed and excellent in color fastness. The dyed knit fabric was not excessively shrunk during the dyeing process, whereby it was very soft, rich in stretchability, and excellent in drape.

The above-mentioned Examples and Comparative examples were shown in the following Tables:

TABLE 1

| | | | | CD-PTT after solid-state polymerization | | | | | | |
|---|---|---|---|---|---|---|---|---|---|---|
| | | Amount of terminal COOH groups in prepolymer (meq/kg resin) | Solid-state polymerization speed (dl/g/hr) | | | | Amount of terminal COOH groups (meq/kg resin) | Hue | | Melting stability (%) |
| | SIPM (mol %) | | | [η] (dl/g) | BPE amount (wt %) | Melting point (° C.) | | L value | b* value | |
| Example 1 | 2.0 | 16 | 0.097 | 0.90 | 0.2 | 227 | 8 | 92 | 1.8 | 95 |
| Example 2 | 2.0 | 16 | 0.104 | 0.91 | 0.2 | 227 | 8 | 92 | 1.2 | 96 |
| Example 3 | 2.5 | 15 | 0.095 | 0.88 | 0.3 | 226 | 10 | 91 | 2.0 | 93 |
| Comparative example 1 | 2.0 | 45 | 0.026 | 0.70 | 0.2 | 226 | 27 | 90 | 6.5 | 92 |
| Comparative example 2 | 2.0 | 43 | 0.025 | 0.71 | 0.2 | 226 | 28 | 91 | 4.8 | 90 |
| Comparative example 3 | 0.0 | 23 | 0.100 | 0.92 | 0.07 | 226 | 23 | 87 | 8.7 | 97 |

Note:
SIPM: dimethyl 5-sodium sulfoisophthalate
BPE: bis (3-hydroxypropyl) ether
meq: milli-equivalent
Terminal COOH groups: terminal carboxylic groups

TABLE 2

| | | | | | CD-PTT after solid-state polymerization | | | | | | |
|---|---|---|---|---|---|---|---|---|---|---|---|
| | | | Esterification reaction ratio (%) when SIPM is added (%) | | | | | Amount of terminal COOH groups (meq/kg resin) | Hue | | Melting stability (%) |
| | G value | SIPM (mol %) | | [η] (dl/g) | BPE amount (wt %) | Melting point (° C.) | | | L value | b* value | |
| Example 4 | 1.5 | 2.0 | 98 | 0.60 | 1.1 | 226 | 24.5 | 81 | 2.0 | 96 |
| Example 5 | 1.0 | 2.0 | 95 | 0.61 | 1.2 | 225 | 26.5 | 81 | 1.8 | 97 |
| Example 6 | — | — | — | 0.92 | 1.2 | 226 | 9.2 | 82 | 1.9 | 96 |
| Example 7 | 1.5 | 2.0 | 98 | 0.61 | 1.8 | 223 | 22.3 | 81 | 2.0 | 94 |
| Comparative example 5 | 1.5 | 2.0 | 0 | 0.59 | 3.3 | 219 | 35.2 | 79 | 4.5 | 92 |
| Comparative example 6 | 3.0 | 2.0 | 97 | 0.58 | 2.6 | 222 | 41.2 | 74 | 5.1 | 90 |
| Comparative example 7 | 1.5 | 2.0 | 60 | 0.60 | 2.7 | 222 | 32.1 | 78 | 4.2 | 92 |
| Comparative example 8 | 1.5 | 0.0 | 98 | 0.74 | 0.8 | 226 | 54.1 | 83 | 7.2 | 96 |

Note:
G value: molar ratio of 1, 3-propanediol relative to terephthalic acid
BPE: bis (3-hydroxypropyl) ether
meq: milli-equivalent
Terminal COOH groups: terminal carboxylic groups

TABLE 3

| | | | | | | | | | Properties of undrawn yarn | | Draw ratio | |
|---|---|---|---|---|---|---|---|---|---|---|---|---|
| | Polymer | SH temperature | Heating tube temperature | Spinneret surface temperature | Orifice diameter | Extrusion rate | Spinning draft | Winding speed | | | | To maximum draw ratio (%) |
| | [η] (dl/g) | (° C.) | (° C.) | (° C.) | (mm) | (g/min) | | (m/min) | Elongation (%) | Tc (° C.) | Ratio (time) | |
| Example 8 | 0.95 | 285 | 250 | 272 | 0.35 | 13.3 | 151 | 800 | 331 | 72 | 3.3 | 74 |
| Example 9 | 0.81 | 285 | 250 | 271 | 0.35 | 12.5 | 161 | 800 | 310 | 70 | 3.1 | 79 |
| Example 10 | 0.95 | 285 | 150 | 263 | 0.35 | 11.7 | 172 | 800 | 289 | 69 | 2.9 | 76 |

TABLE 3-continued

|  | Polymer [η] (dl/g) | SH temperature (° C.) | Heating tube temperature (° C.) | Spinneret surface temperature (° C.) | Orifice diameter (mm) | Extrusion rate (g/min) | Spinning draft | Winding speed (m/min) | Properties of undrawn yarn Elongation (%) | Tc (° C.) | Draw ratio Ratio (time) | To maximum draw ratio (%) |
|---|---|---|---|---|---|---|---|---|---|---|---|---|
| Example 11 | 0.95 | 285 | 250 | 272 | 0.35 | 17.4 | 217 | 1500 | 222 | 67 | 2.3 | 75 |
| Comparative example 9 | 0.50 | 285 | 250 | 272 | 0.35 | 12.1 | 166 | 800 | 298 | 68 | 3.0 | 83 |
| Comparative example 10 | 0.95 | 285 | none | 241 | 0.35 | 7.7 | 263 | 800 | 145 | 61 | 1.9 | 85 |
| Comparative example 11 | 0.95 | 285 | 250 | 272 | 0.35 | 19.4 | 416 | 3200 | 105 | 54 | 1.2 | 77 |

Note:
SH temperature: spin head temperature
Tc: crystallization peak temperature
To Maximum draw ratio: a percentage of draw ratio relative to maximum draw ratio

TABLE 4

|  |  | Example 12 | Example 13 | Comparative example 12 |
|---|---|---|---|---|
| Polymer [η] (dl/g) |  | 0.95 | 0.95 | 0.95 |
| SH temperature (° C.) |  | 285 | 285 | 285 |
| Heating tube temperature (° C.) |  | 250 | 250 | none |
| Spinneret surface temperature (° C.) |  | 274 | 274 | 242 |
| Orifice diameter (mm) |  | 0.35 | 0.35 | 0.35 |
| Extrusion rate (g/min) |  | 21.8 | 25.6 | 13.7 |
| Spinning draft |  | 93 | 147 | 147 |
| First roll | Temperature (° C.) | 75 | 75 | 75 |
|  | Peripheral speed (m/min) | 800 | 1500 | 800 |
| Second roll | Temperature (° C.) | 125 | 125 | 125 |
|  | Peripheral speed (m/min) | 2640 | 3230 | 1690 |
| Winding tension (cN/dtex) |  | 0.04 | 0.09 | 0.06 |
| Winding speed (m/min) |  | 2590 | 3050 | 1630 |
| Draw ratio | Ratio (time) | 3.30 | 2.15 | 2.11 |
|  | To maximum draw ratio (%) | 90 | 88 | 93 |
| Relax ratio (time) |  | 0.98 | 0.94 | 0.96 |
| Properties of undrawn yarn | Elongation (%) | 340 | 235 | 157 |
|  | Tc (° C.) | 74 | 70 | 61 |
| Removal of bobbin |  | ○ | ○ | X |

Note:
SH temperature: spin head temperature
Tc: crystallization peak temperature
Draw ratio; Ratio: a draw ratio between first and second rolls
Draw ratio; To maximum draw ratio: a percentage of draw ratio relative to maximum draw ratio
Removal of bobbin;
○: a cheese-shaped package could be removed from a spindle of a winder.
X: a cheese-shaped package could not be removed from a spindle of a winder.

TABLE 5

|  | Properties of fiber | | | | | | | | | | | |
|---|---|---|---|---|---|---|---|---|---|---|---|---|
|  | [η] (dl/g) | Birefringence | Tmax (° C.) | BWS (%) | Elongation (%) | Strength (cN/dtex) | Toughness | Elastic recovery (%) | Density (g/cm³) | U % | Color of fiber YI | Color of fiber WI | Bulging ratio (%) |
| Example 8 | 0.86 | 0.052 | 116 | 13.2 | 45 | 3.1 | 20.7 | 82 | 1.345 | 1.0 | 2.4 | 80 | — |
| Example 9 | 0.74 | 0.053 | 115 | 14.8 | 42 | 3.0 | 19.4 | 80 | 1.341 | 0.9 | 1.1 | 83 | — |
| Example 10 | 0.87 | 0.048 | 110 | 13.3 | 45 | 2.9 | 19.5 | 75 | 1.343 | 1.2 | 2.1 | 78 | — |
| Example 11 | 0.88 | 0.049 | 108 | 14.0 | 45 | 2.8 | 18.8 | 76 | 1.339 | 0.9 | 1.1 | 80 | — |
| Example 12 | 0.89 | 0.051 | 116 | 10.8 | 50 | 2.9 | 20.6 | 71 | 1.343 | 1.6 | 1.9 | 77 | 7 |
| Example 13 | 0.89 | 0.049 | 110 | 11.2 | 50 | 2.7 | 19.3 | 68 | 1.340 | 1.3 | 2.0 | 77 | 9 |
| Comparative example 9 | 0.47 | 0.053 | 114 | 16.8 | 35 | 2.2 | 13.0 | 77 | 1.338 | 1.0 | 1.1 | 80 | — |
| Comparative example 10 | 0.87 | 0.055 | 95 | 18.9 | 40 | 2.3 | 14.5 | 55 | 1.321 | 3.5 | 1.3 | 78 | — |
| Comparative example 11 | 0.88 | 0.047 | 97 | 18.4 | 40 | 2.2 | 13.9 | 53 | 1.320 | 2.3 | 2.3 | 75 | — |
| Comparative example 12 | 0.87 | 0.049 | 103 | 16.5 | 40 | 2.3 | 14.5 | 54 | 1.323 | 3.3 | 1.8 | 76 | 24 |

Note:
Tmax: peak temperature loss tangent
BWS: boiling water shrinkage

CAPABILITY OF EXPLOITATION IN INDUSTRY

According to the present invention, it is possible to obtain CD-PTT high in melting point, small in loss of the melting viscosity and high in molecular weight, which is suitable as a raw material for CD-PTT fiber excellent in hue.

Further, the inventive polymer and a method for producing the same has unique characteristics unexpectable from the prior art.

The first of the characteristics is that according to the inventive CD-PTT, the degree of whiteness is largely improved in comparison with homo polymer polymerized in the same manner. Although a reason therefor is not yet apparent, the high degree of whiteness is extremely favorable because the color development becomes excellent when fibers are produced from such polymer. Particularly, in the dyeing process using cationic dye requiring the color clarity, the color development is further facilitated if the degree of whiteness of fiber is high.

The second of the characteristics is that, while an amount of terminal carboxyl groups of polyethylene terephthalate dyeable with cationic dye, having a structure similar to that of CD-PTT is usually more than 40 milli-equivalent per kg resin, an amount of terminal carboxyl groups of the inventive PTT is significantly less than the former. If the amount of terminal carboxyl groups is much, there are problems in that when the prepolymer is taken out from an autoclave upon the completion of melt-polymerization, the whiteness and the intrinsic viscosity of the prepolymer become lower or physical properties thereof are largely changed. Also, a fiber strength is largely lowered during the dyeing and/or subsequent processing process. Contrary to this, according to CD-PTT or CD-PTT fiber obtained from the inventive prepolymer hardly has such problems.

The third of the characteristics is that the inventive CD-PTT is less in amount of infusible aggregate originated from metallic salt of ester-forming sulfonic acid, catalyst or heat stabilizer. If the amount of aggregate is less, it is possible to prolong the replacement period of spinning pack, which guarantees the continuous spinning for a long time and a high productivity. Also, if the amount of aggregate is less, the generation of fluff or yarn breakage decrease to improve the spinning yield. Since catalyst used or others is different from that of the present invention in the poly (ethylene terephthalate) dyeable with cationic dye having a similar structure, the problem of infusible aggregate has not yet been completely solved, and a large amount of aggregate is still contained.

As described above, as the inventive CD-PTT has superior performance, it is useful as a raw material for fiber, molded product or film. Particularly, the inventive CD-PTT fiber is dyeable with cationic dye, high in toughness and free from excessive shrinkage during the dyeing or subsequent processing, whereby fabrics applicable to various clothings is easily designed. This fiber is particularly suitable for the use in which it is combined with polyester of polyurethane elastomeric fiber, or treated with urethane type resin.

A fibrous product which is one of suitable fields of its application includes a clothing such as an outer wear, an inner wear or a sportswear, an industrial material such as a carpet, a flock, a monofilament or padding, a non-woven sheet such as a spun-bonded fabric, a micro-web or a spun lace.

What we claimed is:

1. A poly(trimethylene terephthalate) copolymer characterized in that it satisfies the following conditions (1) to (4):

(1) ester-forming sulfonate in a range from 0.5 to 5 mol % is copolymerized relative to a total dicarbonic acid component;
   (2) bis (3-hydroxypropyl) ether in a range from 0.1 to 2.5 wt % is copolymerized;
   (3) an intrinsic viscosity is in a range from 0.65 to 1.5 dl/g, and
   (4) an amount of terminal carboxyl groups is 25 milli-equivalent per kg resin or less.

2. A poly(trimethylene terephthalate) copolymer as defined by claim 1 wherein the intrinsic viscosity is in a range from 0.85 to 1.25 dl/g.

3. A poly(trimethylene terephthalate) copolymer as defined by claim 1 wherein a b* value is in a range from −2 to 6.

4. A method for producing a poly(trimethylene terephthalate) copolymer characterized in that the method comprises the steps of: reacting lower alcohol ester of terephthalic acid, which is a main dicarboxylic acid component, with 1,3-propanediol, which is a main diol component, to form 1,3-propanediol ester of terephthalic acid and/or oligomer thereof; after completing the polycondensation reaction, once solidifying the resultant polymer; and heating the polymer in a solid state to increase an intrinsic viscosity thereof by 0.1 dl/g or more from that at a time when the polycondensation reaction has completed, and the method satisfies the following conditions (a) and (b):

(a) ester-forming sulfonate corresponding to an amount in a range from 0.5 to 5 mol % of a total dicarboxylic acid component is added at any optional stage from the initiation of reaction to the completion of the polycondensation reaction, and
   (b) an amount of terminal carboxyl groups of poly (trimethylene terephthalate) copolymer is in a range from 5 to 40 milli-equivalent per kg resin before the initiation of solid-state polymerization.

5. A method for producing a poly(trimethylene terephthalate) copolymer characterized in that the method comprises the steps of: reacting terephthalic acid, which is a main dicarboxylic acid component, with 1,3-propanediol, which is a main diol component, to form 1,3-propanediol ester of terephthalic acid and/or oligomer thereof; after completing the polycondensation reaction, solidifying the resultant polymer; and heating the polymer in a solid state to increase an intrinsic viscosity thereof by 0.1 dl/g or more from that at a time when the polycondensation reaction has completed, and the method satisfies the following conditions (a) to (c):

(a) the molar ratio of 1,3-propanediol to terephthalic acid is in a range from 0.8 to 2.5,
   (b) in the reaction of terephthalic acid with diol mainly composed of 1,3-propanediol, at a stage wherein a rate of reaction of terephthalic acid is in a range from 75 to 100%, an amount of ester-forming sulfonate corresponding to a range from 0.5 to 5 mol % of total dicarboxylic acid component is added, and
   (c) the amount of terminal carboxyl groups of poly (trimethylene terephthalate) copolymer is in a range from 5 to 40 milli-equivalent per kg resin before the initiation of solid-state polymerization.

6. A method for producing a poly(trimethylene terephthalate) copolymer comprising the steps of: by reacting terephthalic acid, which is a main dicarboxylic acid component, with 1,3-propanediol, which is a main diol component, to form 1,3-propanediol ester of terephthalic acid and/or oligomer thereof; after completing the polycondensation reaction, characterized in that the method satisfies the following conditions (a) to (c):

(a) a molar ratio of 1,3-propanediol to terephthalic acid is in a range from 0.8 to 2.5, (b) in the reaction of terephthalic acid with diol mainly composed of 1,3-propanediol, at a stage wherein a rate of reaction of terephthalic acid is in a range from 75 to 100%, an amount of ester-forming sulfonate corresponding to a range from 0.5 to 5 mol % of total dicarboxylic acid component is added, and (c) an amount of terminal carboxyl groups of poly (trimethylene terephthalate) copolymer is in a range from 5 to 40 milli-equivalent per kg resin.

7. A method for producing a poly(trimethylene terephthalate) copolymer as defined by any one of claims 4 to 6, wherein an alkaline metal compound and/or an alkaline earth metal compound corresponding to an amount in a range from 1 to 100 mol % of ester-forming sulfonate is added at any optional stage from the initiation of reaction to the completion of the polycondensation reaction.

8. A poly(trimethylene terephthalate) copolymer fiber characterized in that it satisfies the following conditions (1) to (4):

(1) ester-forming sulfonate in a range from 0.5 to 5 mol % is copolymerized relative to a total dicarboxylic acid component;

(2) bis (3-hydroxypropyl) ether in a range from 0.1 to 2.5 wt % is copolymerized;

(3) an intrinsic viscosity is in a range from 0.65 to 1.5 dl/g, and (4) an amount of terminal carboxyl groups is in a range from 5 to 40 milli-equivalent per kg fiber or less.

9. A poly(trimethylene terephthalate) copolymer fiber characterized in that ester-forming sulfonate in a range from 0.5 to 5 mol % is copolymerized relative to a total dicarboxylic acid component, and the fiber satisfies the following conditions (A) to (C):

(A) an intrinsic viscosity [η] is in a range from 0.65 to 1.4 dl/g, (B) a peak temperature of a dynamic loss tangent is in a range from 105 to 140° C., and (C) a boiling water shrinkage is in a range from 0 to 16%.

10. A poly(trimethylene terephthalate) copolymer fiber as defined by claim 9, further satisfying the following conditions (D) and (E):

(D) an elongation at break is in a range from 20 to 70%, and (E) a toughness is 16 or more, wherein the toughness is calculated by the following equation:

Toughness=[Strength ($cN/dtex$)]×[Elongation (%)]$^{1\!/\!2}$

11. A poly(trimethylene terephthalate) copolymer fiber as defined by claim 10, wherein the toughness is 17.5 or more.

12. An undrawn poly(trimethylene terephthalate) copolymer fiber characterized in that it consists of poly (trimethylene terephthalate) formed by copolymerizing ester-forming sulfonate in a range from 0.5 to 5 mol % to a total dicarboxylic acid component to have an intrinsic viscosity in a range from 0.65 to 1.4 dl/g, and it has an elongation at break in a range from 150 to 600% and a crystallization peak temperature in a range from 64 to 80° C.

13. A method for producing a poly(trimethylene terephthalate) copolymer fiber characterized in that an undrawn poly(trimethylene terephthalate) copolymer fiber, having an elongation at break in a range from 150 to 600% and a crystallization peak temperature in a range from 64 to 80° C., is drawn at a draw ratio in a range from 30 to 99% of the maximum draw ratio, and the undrawn poly (trimethylene terephthalate) copolymer fiber consists of poly (trimethylene terephthalate) formed by copolymerizing ester-forming sulfonate in a range from 0.5 to 5 mol % to a total dicarboxylic acid component to have an intrinsic viscosity in a range from 0.65 to 1.5 dl/g.

14. A method for producing a poly(trimethylene terephthalate) copolymer fiber characterized in that the poly(trimethylene terephthalate) is formed by copolymerizing ester-forming sulfonate in a range from 0.5 to 5 mol % to a total dicarboxylic acid component to have an intrinsic viscosity in a range from 0.65 to 1.5 dl/g, the poly (trimethylene terephthalate) is extruded from a spinneret having a surface temperature in a range from 250 to 295° C. and, after being cooled and solidified, is taken up at a speed in a range from 100 to 3,000 m/min to be an undrawn yarn which is then drawn at a temperature in a range from 30 to 90° C. and a draw ratio which is in a range from 30 to 99% of the maximum draw ratio, and then a drawn fiber obtained is heat-treated at a temperature from 100 to 200° C.

15. A method for producing a poly(trimethylene terephthalate) copolymer fiber as defined by claim 14, wherein the polytrimethlene terephthalate is extruded from a spinneret with a heating tube having a length in a range from 20 to 500 mm and heated at a temperature in a range from 150 to 350° C.

16. A method for producing a poly(trimethylene terephthalate) copolymer fiber as defined by any one of claims 13 to 15, wherein the undrawn fiber is once wound as a package and then drawn.

17. A method for producing a poly(trimethylene terephthalate) copolymer fiber as defined by any one of claims 13 to 15, wherein the undrawn fiber is not wound as a package but is continuously drawn.

18. A staple fiber obtained from the poly(trimethylene terephthalate) copolymer fiber as defined by any one of claims 8 to 10, wherein the fiber length is in a range from 3 to 300 mm and a degree of crimp is 5% or more.

19. A fiber product in which the poly(trimethylene terephthalate) copolymer fiber as defined by any one of claims 8 to 10 is partially or wholly used.

20. A fiber product in which the staple fiber as defined by claim 18 is partially or wholly used.

* * * * *